United States Patent [19]
Henmi et al.

[11] Patent Number: 5,552,833
[45] Date of Patent: Sep. 3, 1996

[54] TRANSMISSION SYSTEM AND RECEIVER USING TELETEXT INFORMATION FOR PROGRAMMING VIDEO RECORDER

[75] Inventors: Hidemi Henmi, Otsu; Shigeru Takano, Ibaraki; Hideto Nakahigashi, Osaka; Ken Sakamoto, Takatsuki, all of Japan

[73] Assignee: Matsushita Electric Industrial Co., Ltd., Osaka, Japan

[21] Appl. No.: 844,611

[22] PCT Filed: Aug. 7, 1991

[86] PCT No.: PCT/JP91/01056

§ 371 Date: Apr. 7, 1992

§ 102(e) Date: Apr. 7, 1992

[87] PCT Pub. No.: WO92/03018

PCT Pub. Date: Feb. 20, 1992

[30] Foreign Application Priority Data

Aug. 10, 1990 [JP] Japan .................................. 2-212879
Dec. 11, 1990 [JP] Japan .................................. 2-401285
Dec. 11, 1990 [JP] Japan .................................. 2-401286
Dec. 11, 1990 [JP] Japan .................................. 2-401287

[51] Int. Cl.⁶ .................................................... H04N 7/08
[52] U.S. Cl. .......................... 348/460; 348/467; 348/478; 348/906; 358/335
[58] Field of Search .................................. 358/142, 147, 358/335; 348/460, 906, 467, 478, 731, 734; 360/33.1, 69, 14.1, 27; H04N 7/00, 7/08, 7/087, 5/76, 5/78, 5/782

[56] References Cited

U.S. PATENT DOCUMENTS 4,337,485 6/1982 Chambers .
5,038,211 8/1991 Hallenbeck .............................. 348/906

FOREIGN PATENT DOCUMENTS 0037077 10/1981 European Pat. Off. .
0300562 1/1989 European Pat. Off. .
0306208 3/1989 European Pat. Off. .
0309878 4/1989 European Pat. Off. .
0312798 4/1989 European Pat. Off. .

(List continued on next page.)

OTHER PUBLICATIONS

European Broadcasting Union, "Specification of the Domestic Video Programme Delivery Control System (PDC)", Tech. 3262–E, pp. 3–44, (Aug. 1990).

"TOP macht Fernsehtext benutzerfreundlich", *NTZ Nachrichtentechnische Zeitschrift*, vol. 42, No. 11, pp. 724–727 (Nov. 30, 1989).

R. Huschke et al., "Vom Ferneher zum Info–Terminal", *Funkschau*, vol. 61, No. 13, pp. 55–58 (Jun. 16, 1989).

E. G. Breeze, "Television Line 21 Encoded Information and its Impact on Receiver Design", *IEEE Transactions on Broadcast and Television Receivers*, vol. BTR–18, No. 4, pp. 234–237 (Nov. 1972).

*Primary Examiner*—David E. Harvey
*Attorney, Agent, or Firm*—Ratner & Prestia

[57] ABSTRACT

A method and system in which television-program table information is transmitted using teletext formats in a coding transmission system. On the reception side, reservation of video recording with an image recording apparatus is effected by making use of the transmitted television-program table information. Reserving a recording time is accomplished using a program recognition device 9 which detects that the television-program table information has been transmitted. Further, a program update recognition device 10, a channel information processing device 11, a date information processing device 12, a time information processing device 13, a program code information processing device 14, and a title information processing device 15 serve to process their respective information in order to display the television program table on a display unit. Once displayed, a television program desired for video recording is selected by a cursor display device and selection device 19. The advantageous result is a simplified implementation of reservation of video recording.

7 Claims, 22 Drawing Sheets

FOREIGN PATENT DOCUMENTS

| | | |
|---|---|---|
| 0368313 | 5/1990 | European Pat. Off. . |
| 0379713 | 8/1990 | European Pat. Off. . |
| 0393556 | 10/1990 | European Pat. Off. . |
| 0416706 | 3/1991 | European Pat. Off. . |
| 3313799 | 6/1984 | Germany .............................. 358/355 |
| 3335082 | 11/1985 | Germany . |
| 3634757 | 1/1988 | Germany . |
| 1200791 | 11/1989 | Japan . |
| 2-12731 | 2/1990 | Japan . |
| 2-210987 | 8/1990 | Japan . |
| 3-106191 | 2/1991 | Japan . |
| 3-114377 | 5/1991 | Japan . |
| 3-114376 | 5/1991 | Japan . |
| 3-114375 | 5/1991 | Japan . |
| 3-107291 | 7/1991 | Japan . |
| 2207314 | 1/1989 | United Kingdom . |
| 0002205 | 3/1989 | WIPO . |

|       | b8 | b7 | b6 | b5 | b4 | b3 | b2 | b1 |
|-------|----|----|----|----|----|----|----|----|
| DB1 | Heading Start Sign |||||||| 
| DB2 | Data Group Identification Sign |||| Data Group Retransmission Sign ||||
| DB3 | Data Group Link Sign ||| Data Group Serial Number |||||
| DB4 | Data Group Size ||||||||
| DB5 | Data Group Size ||||||||
| DB6 | Operating Data ||||||||
| DB7 | Operating Data ||||||||

DB1–DB5: Data Group Header

FIG. 4
(PRIOR ART)

|       | b8 | b7 | b6 | b5 | b4 | b3 | b2 | b1 |
|-------|----|----|----|----|----|----|----|----|
| DB8 | Information Separating Sign ||||||||
| DB9 | Data Header Parameter ||||||||
| DB10 | Data Header Data Length ||||||||
| DB11 | Magazine Number |||| Program Number 1 ||||
| DB12 | Program Number 2 |||| Program Number 3 ||||
| DB13 | ||||||||
| DB14 | ||||||||
| DB15 | ||||||||
| DB16 | ||||||||
| DB17 | ||||||||
| DB18 | ||||||||
| DB19 | ||||||||

DB8–DB9: Data Header Identification
DB8–DB19: Data Header
DB11–DB19: Data-Header Data

| b4 b3 b2 b1 | b8<br>b7<br>b6<br>b5 | 0<br>0<br>1<br>0<br>2 | 0<br>0<br>1<br>1<br>3 | 0<br>1<br>0<br>0<br>4 | 0<br>1<br>0<br>1<br>5 | 0<br>1<br>1<br>0<br>6 | 0<br>1<br>1<br>1<br>7 |
|---|---|---|---|---|---|---|---|
| 0 0 0 0 | C | Text | 1-byte DRCS | | | | |
| 0 0 0 1 | 1 | | 2-byte DRCS * | | | | |
| 0 0 1 0 | 2 | | DJCS | | | | |
| 0 0 1 1 | 3 | | | | | | |
| 0 1 0 0 | 4 | Header Text | Color Map * | | | | |
| 0 1 0 1 | 5 | | Time Response Control * | | | | |
| 0 1 1 0 | 6 | | | | | | |
| 0 1 1 1 | 7 | | | | | | |
| 1 0 0 0 | 8 | Geometric * | Photographic Monolayer | | | | |
| 1 0 0 1 | 9 | | Photographic Multilayer * | | | | |
| 1 0 1 0 | 10 | | | | | | |
| 1 0 1 1 | 11 | | Continuation | | | | |
| 1 1 0 0 | 12 | Added Sound Information | Tele-Software ** | | | | |
| 1 1 0 1 | 13 | | Program Index | | | | |
| 1 1 1 0 | 14 | | Dummy | | | | |
| 1 1 1 1 | 15 | | Network Operation | | | | |

FIG. 8
(PRIOR ART)

CHARACTER CODE TEST A 010-01

This is a test broadcast of a
television character multiple
broadcast. In this new broadcast,
character information is
transmitted making use of a space
between pictures of the television.
With provision of a character
receiver unit, the user on the
receiver can select one program
among the several different
character broadcast programs
and display the same on the
image receiving tube when desired.

Header Text

| 1F | 24 | 00 | 1C | 09 | 85 | 1D | 61 | 0E | 62 | 38 | 33 | 79 | 49 | 09 | 38 | 43 | 31 |
| 73 | 09 | 1D | 60 | 0E | 41 | 09 | 87 | 30 | 31 | 30 | 2D | 30 | 31 | | | | |

Text

| 1F | 20 | 00 | B6 | 09 | 1D | 61 | 83 | B3 | EC | CF | 0E | 3C | 4A | 7C | 0F | 4A | 38 |
| 3B | 7A | 42 | 3F | 3D | 45 | 4A | 7C | 3F | 37 | B7 | A4 | 4A | 7C | 53 | 4A | 7C | 41 |
| 77 | C7 | B9 | FA | B3 | CE | 3F | 37 | B7 | A4 | 4A | 7C | C7 | CF | 4A | C8 | 33 |
| 38 | 3B | 7A | 3E | 70 | 4A | 73 | AC | 0E | 46 | 6C | 78 | CE | 0F | 33 | 28 | C8 | 33 |
| 28 | CE | 34 | 56 | CE | B9 | AD | DE | F2 | 4D | 3C | 54 | CF | FD | B7 | C6 | 41 | 77 |
| E9 | EC | DE | B9 | FA | 0D | 3C | 75 | 3F | 2E | 3C | 54 | B9 | EC | D0 | FD | 32 | 3B | 7A |
| 3C | 75 | 3F | 2E | 35 | 21 | F2 | 4D | 51 | 30 | 55 | 4A | 7C | 41 | 77 | 48 | 56 | 41 | 48 |
| GF | 4E | 60 | AB | CE | 4A | 38 | 3B | 7A | 4A | 7C | CA | C8 | 31 | 47 | B7 | 3D | 50 | 2A | D3 | 3D |
| AB | E9 | 23 | 31 | C4 | F2 | FD | 39 | 25 | AD | CA | CB | 31 | 47 | B7 | 3D | 50 | B9 | B3 |
| 50 | 87 | FD | 3C | 75 | 41 | 7C | 34 | 49 | CB | FA | | | | | | | | |
| CB | AC | 3D | 50 | 4D | 68 | DE | B9 | 89 | FA | | | | | | | | | |

```
  | 1| 2| 3| 4| 5| 6| 7| 8| 9|10|11|12|13|14|15|16|17|18|19|20|21|22|23|24|25|26|27|28|29|30|31|
```

Telemo—Nikon Character Broadcast                931#—04/09

1    NHK        Television Program Table on Dec. 1(FKI)

2    14:00 ~    | 22 |    The Whole of America 3    15:00 ~    | 23 |    Marketing Information in Tokyo 4    15:40 ~    | 24 |    World News 5    16:00 ~    | 25 |    From Hometown Nippon Islands 6                     (From Abashiri)

7    17:00 ~    | 26 |    Documentary in the World 8    18:00 ~    | 27 |    Relay broadcast of NBA Professional Basketball

| | | |
|---|---|---|
| | Text Start Sign | |
| PB1 | Data Unit Separation Sign | |
| 2 | Data Unit Parameter | |
| 3 | Data Unit Link Flag | Data Unit Length |
| 4 | Data Unit Length | |
| 5 | Television Program Identification Number | ① |
| 6 | Program Broadcasting Start Time (Hour ; 10dgts) | Program Broadcasting Start Time (Hour ; 1dgts) | ② |
| 7 | Program Broadcasting Start Time (Min ; 10dgts) | Program Broadcasting Start Time (Min ; 1dgts) | ③ |
| 8 | Program Broadcasting Terminate Time (Hour ; 10dgts) | Program Broadcasting Terminate Time (Hour ; 1dgts) | ④ |
| 9 | Program Broadcasting Terminate Time (Min ; 10dgts) | Program Broadcasting Terminate Time (Min ; 1dgts) | ⑤ |
| 10 | Program Classification Identification Index | ⑥ |
| | Program Title Data Length | ⑦ |
| | Program Title Data | ⑧ |
| | Added Data Length | ⑨ |
| | ① --- ⑨ | |
| | ① --- ⑨ | |
| | Added Data Control | |
| | Sub Channel Identification Number | |
| | Sub Program Broadcasting Start Time (Hour ; 10dgts) | Sub Program Broadcasting Start Time (Hour ; 1dgt) |
| | Sub Program Broadcasting Start Time (Min ; 10dgts) | Sub Program Broadcasting Start Time (Min ; 1dgt) |
| | Sub Program Broadcasting Terminate Time (Hour ; 10dgts) | Sub Program Broadcasting Terminate Time (Hour ; 1dgt) |
| | Sub Program Broadcasting Terminate Time (Min ; 10dgts) | Sub Program Broadcasting Terminate Time (Min ; 1dgt) |
| | Text End Sign | |
| | CRC | |
| | CRC | |

Auxiliary Data for Program 1 spans ① through ⑨ (Data Unit)
Auxiliary Data for Program 2
Auxiliary Data for Program 3
Auxiliary Data for Program N

TRANSMISSION SYSTEM AND RECEIVER USING TELETEXT INFORMATION FOR PROGRAMMING VIDEO RECORDER

TECHNICAL FIELD

The present invention relates to a transmission system and a receiver for, on the transmission side, transmitting television-program table information such as channel information, date information, time information, program code information, and title information using teletext of the coding transmission system and, meanwhile on the reception side, reserving a video recording on image recording/reproducing apparatus using the received television-program table information.

BACKGROUND OF THE INVENTION

In recent years, a teletext of coding transmission system has come into practical use that allows character and graphic information such as news, weather forecasts, and stock market, which are provided by combinations of characters and graphics, to be presented on a screen of a household television receiver. Also, there have been developed television receivers with a built-in receiver for receiving teletext in a coding transmission system. Hereinbelow, the teletext and its teletext receiver equipment in a coding transmission system as described above are explained with reference to the drawings.

FIG. 1 shows a construction of a conventional teletext receiver. In the figure, represented by reference character a is a television video signal; so by numeral 1 is a character signal extracting section for extracting character signals superimposed on the vertical blanking intervals from the video signal a; 2 is a data block linking section for linking the character signals in the units of data blocks extracted by the character signal extracting section 1 and classifying them into data groups; 3 is a data type deciding section for deciding whether the data groups classified by the data block linking section 2 are program data, page data, or index data; 4 is a character-program data decoder section for decoding character-program data according to the types of data decided by the data type deciding section 3 to develop the data into characters and graphics for display; 5 is a buffer memory section for accumulating the signals decided as character-program data by the data type deciding section 3; 6 is a display control section for actually displaying display data developed into characters and graphics at the character-program data decoder section 4 on a screen or the like; 7 is a video memory section for storing display data to be actually displayed on the screen or the like by the display control section 6; and 8 is a sound generator section for performing actual sound generation according to added sound data decoded by the character-program data decoder section 4.

FIG. 2 shows the hierarchy of a teletext signal of the coding transmission system. In the FIG. 2, hierarchy 1 is a physical layer, representing the item elements of a character signal as an electrophysical signal. This signal is also superimposed on 14H, 15H, 16H, and 21H of the vertical blanking interval of the television signal. At a link layer of a hierarchy 2, the character signal is treated as logical data of either 1 or 0. Data lines, each of which refers to a transmission unit of character signals transmitted during one horizontal scanning line interval of a television video signal, is composed of a synchronization part and a data packet. The data packet, which refers to a part of the data line in which the synchronization part is eliminated, is composed of a prefix, data blocks, and check codes. Primarily the function of prefix is exerted at hierarchy 3 of a network layer. The prefix refers to data for identification and control, added to the head of the data packet, while the data blocks refer to a part of the data packet in which the prefix and the check code are eliminated, for transmitting various types of information data. Hierarchy 4 is a transport layer, representing the functions of data groups. The data groups are composed of data groups, each being one group of information data transmitted by one data block or a plurality of data blocks. Hierarchy 5 is a session layer, representing the structure of program data and functions for identification control of the program, and the like. Hierarchy 6 is a presentation layer, representing the functions of coding the presentation, where the coding for displaying characters and graphics and for presenting added sounds is specified.

FIG. 3 shows the structure of program management data and page data. Transmitted to the head of the program data is program management data pertaining to the whole of the program. The program management data or page data is composed of a data header and several units.

FIG. 4 shows the structure of a data group header and the transmission procedure thereof. Referring to FIG. 4, the data group header is composed of a data group identification code for identifying and controlling data groups, a data group retransmission code, a data group link code, a data group serial number, data group size, and working data. In this structure, the data group identification code represents the type of a data group by binary value, where program management data or page data is assigned "0", while program index data is assigned "15."

FIG. 5 shows the structure of a data header and the transmission procedure thereof. Referring to FIG. 5, the data header is composed of data-header identification, data-header data length, and data-header data. The data-header identification represents the function of identifying the type of a data header, and the coding representation thereof is composed of an information separation code and data-header parameters. Correspondence between data headers and parameters is such that program data header, page data header, program search data header, and continuation data header correspond to data-header parameters 02/0–3, respectively.

FIG. 6 shows the structure of a data unit and the transmission procedure thereof. Referring to FIG. 6, the data unit is composed of data-unit identification, data-unit data length, and unit data. The data-unit identification represents the function of identifying the type of a data unit, and the coding representation thereof is composed of a data-unit separation code and data-unit parameters. Data-unit parameters of the current system are assigned 16 types of identification parameters such as text, header text, a color map, and a program index. A data-unit link flag represents whether or not the succeeding data unit is a continuation data unit and to be linked, while the data-unit data length represents the data length of a data-unit data. The data-unit data is a piece of data that represents the number of data represented by data-unit data length.

FIG. 7 shows the assignment of the current data-unit parameters. In FIG. 7, the blank fields are unused.

FIG. 8 gives an example of coding in the current teletext. In FIG. 8, there are two data units, and data-unit parameters are "24H" and "20H," these two data units representing "header text" and "text," respectively.

The teletext receiver equipment constructed as in FIG. 1 is now described about its operation.

From the input video signal a, the character signal extracting section 1 extracts character signals superimposed on the vertical blanking intervals 14H, 15H, 16H, and 21H. The data block linking section 2 picks up data blocks out of the character signals extracted at the character signal extracting section 1, and thereafter links the data and classifies them into data groups. The data type deciding section 3 decides whether the data groups classified by the data block linking section 2 are program data, page data, or index data, according to data group identification codes. Thereafter, the character-program data decoder section 4 accumulates character-program data derived from the data type deciding section 3 in the buffer memory section 5, while it extracts character-program data pertaining to a program number needing presentation from the character-program data accumulated in the buffer memory section 5. According to the type of the character-program data, character signals are decoded as shown in FIG. 8, and the resulting character/graphic screen information is written into the video memory section 7 through the display control section 6. The display control section 6 sequentially reads the character/graphic screen information written into the video memory section 7, yielding an output of display signal b. Further, if the program data needing presentation has any added sound information, the character-program data decoder section 4 decodes the added sound information, and transmits sound-generation data to the sound generator section 8, where the sound generator section 8 produces a sound signal based on the sound-generation data.

In the teletext, data transmission is carried out in the above-described transmission procedure. On the side of teletext receiving equipment, character and graphic information coded according to the transmission procedure are decoded, offering the services that still images such as news and weather forecasts are displayed on television. More recently, with a view to making the teletext further widespread, new services are under discussion in which television-program table information (program title, program broadcasting date, program broadcasting time, etc.) are encoded, transmitted as data unit data by expanding the transmission procedure while compatibility with the conventional teletext is maintained (i.e. by defining new parameters), so as to allow the teletext to be utilized for video recording reservation by image recording/reproducing apparatus such as VTRs. However, the conventional teletext receiving equipment cannot afford such expansion of the transmission procedure as it stands, prohibiting their users from enjoying the new services.

Meanwhile, since the operation for recording reservation with the current VTRs is so complicated and difficult to understand that beginners and those unfamiliar to video/audio appliances cannot manage it. This accounts for the strong desire that this operation for recording reservation be made easier.

The present invention, in view of the foregoing problems, has developed a transmission system in which television-program table information is defined on transmission, and further provides a receiving apparatus in which the television-program table information is recognized and processed on the receiver side so that the recording reservation in the image recording/reproducing apparatus can be simplified and that change in the time of recording reserved programs can be treated.

DISCLOSURE OF THE INVENTION

The transmission system according to the present invention is characterized in that, for use in a system in which, on the transmission side, television-program table information such as channel information, date information, time information, program code information, and title information are transmitted using the teletext of coding transmission system while, on the reception side, reservation of a video recording on an image recording/reproducing apparatus is effected by making use of the received television-program table information, data-unit parameters for television-program table information by the teletext of the coding transmission system are newly provided, and wherein program-content update information, channel information, date information, time information, program code information, and title information of the television-program table information are transmitted as data-unit data.

The receiver according to the present invention is characterized in that it comprises: a first program recognition means for recognizing television-program table information by providing a limitation on television-program table information; a first program update recognizing and processing means for recognizing and processing program-content update information from data-unit data; a first channel information processing means for processing channel information from the data-unit data; a first date information processing means for processing date information; a first time information processing means for processing time information; a first program code information processing means for processing program code information; a first title information processing means for processing title information; display means for displaying data processed by the first program update recognizing and processing means, the first channel information processing means, the first date information processing means, the first time information processing means, the first program code information processing means, and the first title information processing means onto a display unit; cursor display means for displaying a cursor for each one of the television programs displayed by the display means; cursor moving means for moving the cursor displayed by the cursor display means for each program; selection means for selecting reservation of a video recording of a television program designated by the cursor of the cursor display means; storage means for storing television-program table information such as channel information, date information, time information, program code information, and title information of the television program selected by the selection means; timer means for performing time management; comparator means for comparing between date information and time information of the video-recording reserved program stored in the storage means with date information and time information of the timer means; start instruction means for instructing an image recording/reproducing apparatus to start a video-recording operation when start time information of the date information and the time information of the video-recording reserved program coincides with the date information and the time information of the timer means; and termination time instruction means for instructing the image recording/reproducing apparatus to terminate the video-recording operation when termination time information of the date information and the time information of the video-recording reserved program coincides with the date information and the time information of the timer means.

According to the feature of the present invention having such an arrangement as described above, reservation of a video recording to be simply rendered on an image recording/reproducing apparatus is allowed only by automatically detecting a television-program table program out of teletext programs, taking out information necessary for video recording reservation in the image recording/reproducing apparatus and displaying them onto a display unit, and selecting information such as title name on a television-program table displayed on the display unit with a cursor. Further, even if the television program for which a video recording has been rendered on an image recording/reproducing apparatus should be canceled because of any change or extension of the program on the transmission side, or even if its broadcasting time should be changed, these changes and extensions could be automatically followed up if television-program table information which includes the contents of the change on teletext is transmitted, thus allowing the video recording of the reserved television program to be carried out by automatically following.

BRIEF DESCRIPTION OF THE DRAWINGS

FIG. 1 is a block diagram of a conventional teletext receiver; FIG. 4 is a view showing the structure of the data group header and the transmission procedure thereof; FIG. 5 is a view showing the structure of the data header and the transmission procedure thereof; FIG. 7 is a view showing the assignment of the current data-unit parameters; FIG. 8 is a view showing an example of coding in the conventional teletext; FIG. 14 is a view showing an example of screen arrangement of a television-program table program; FIG. 20 is a view for explaining a sixth embodiment of the invention, schematically showing yet another structure of the same data unit and the transmission procedure thereof.

BEST MODE FOR CARRYING OUT THE INVENTION

Now the transmission system and receiver according to the first embodiment of the present invention is described below with reference to the drawings.

Figure 2:
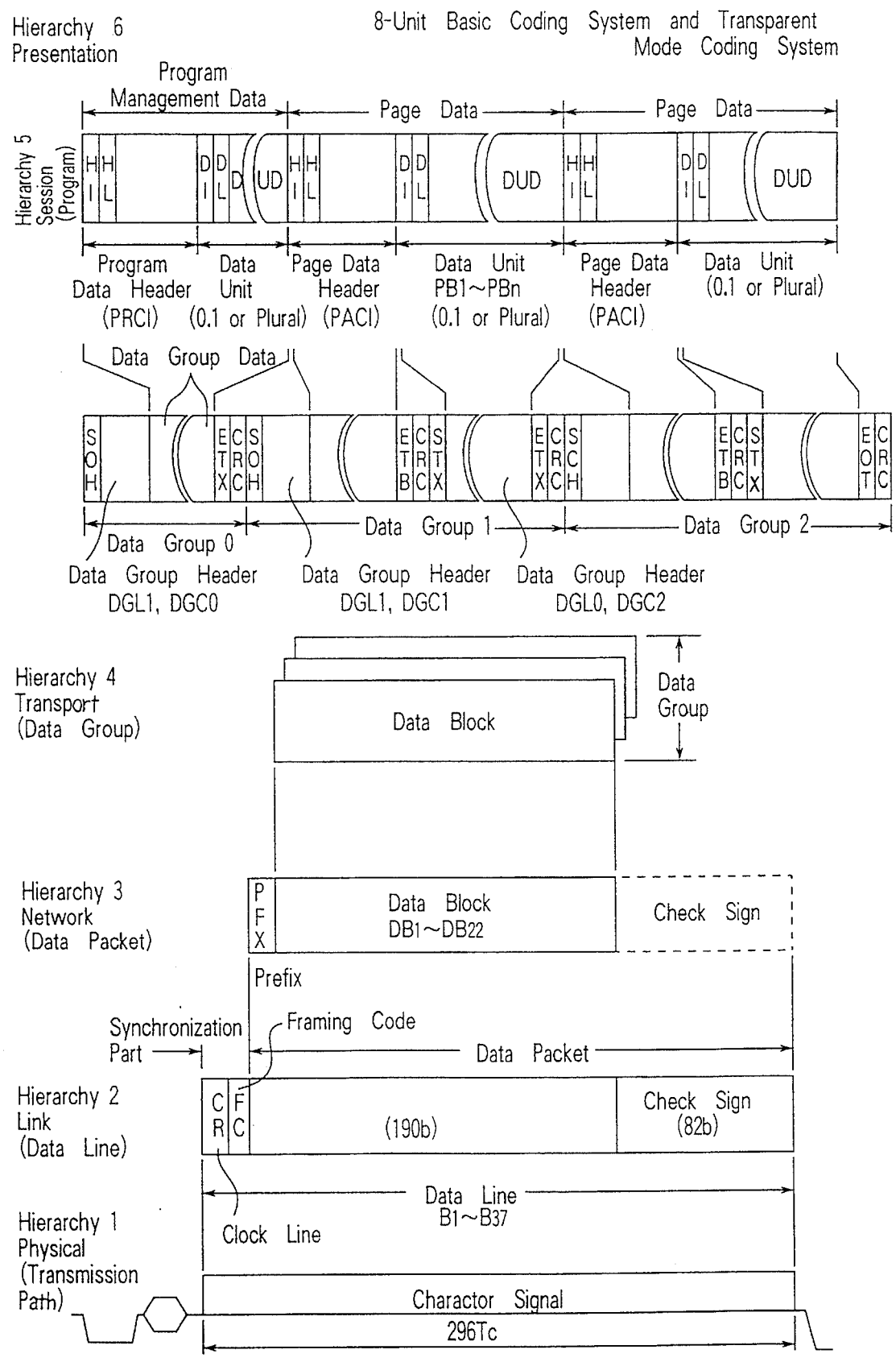
FIG. 2 is a view showing a hierarchy of a teletext signal in a coding transmission system.
Figure 3:
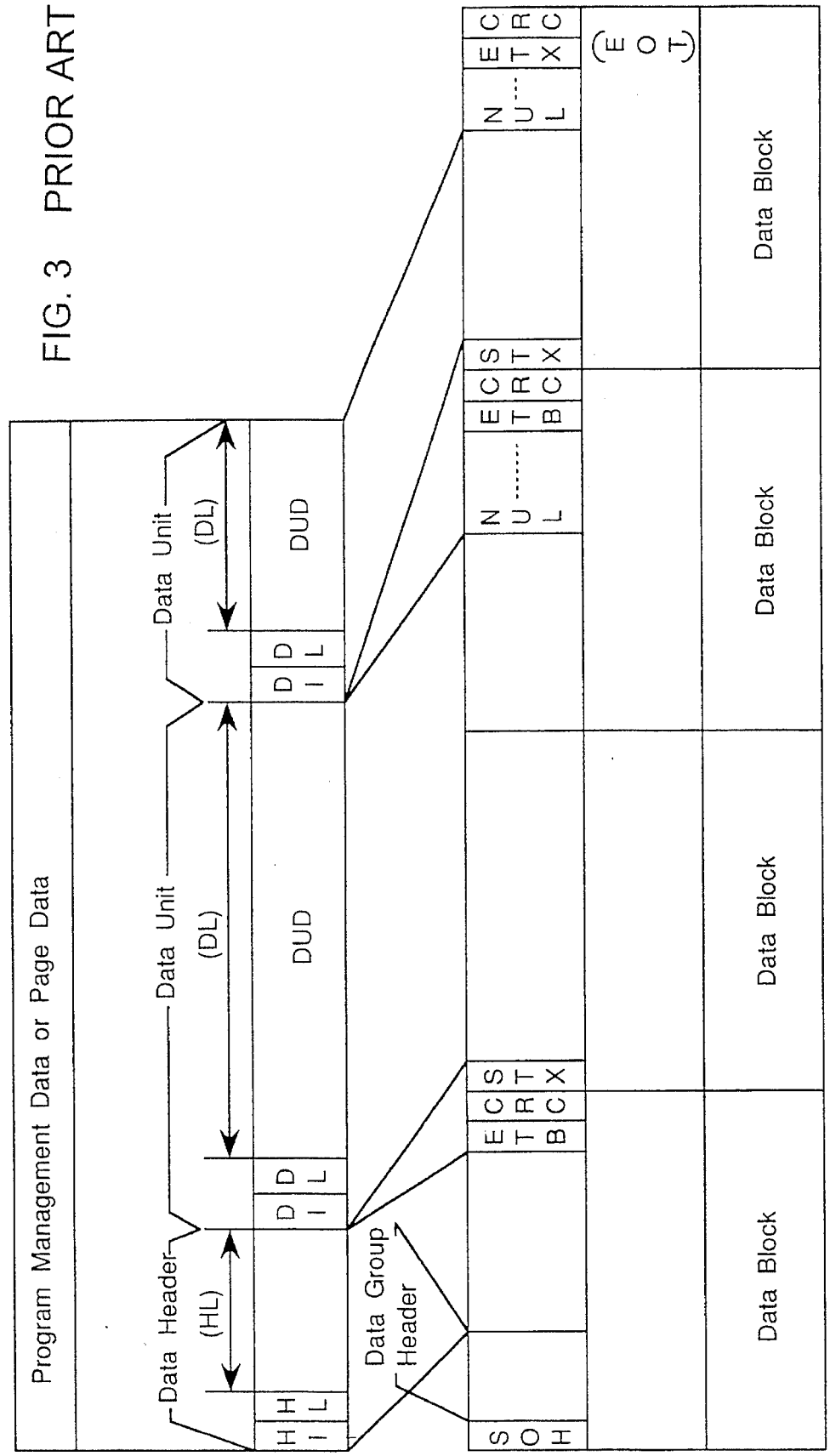
FIG. 3 is a view showing a structure of program management data and page data.
Figure 6:
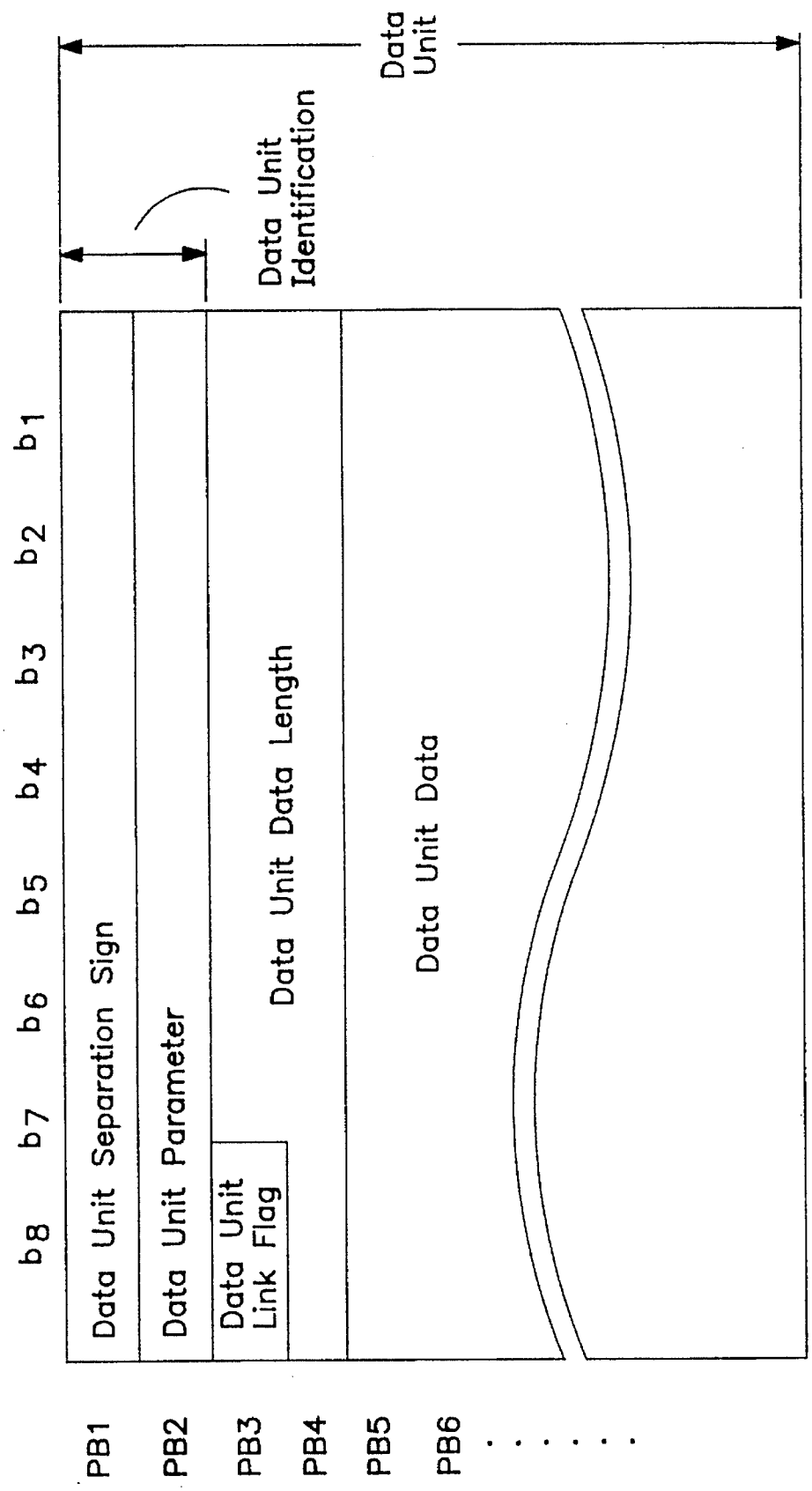
FIG. 6 is a view showing the structure of the data unit and the transmission procedure thereof.
Figure 9:
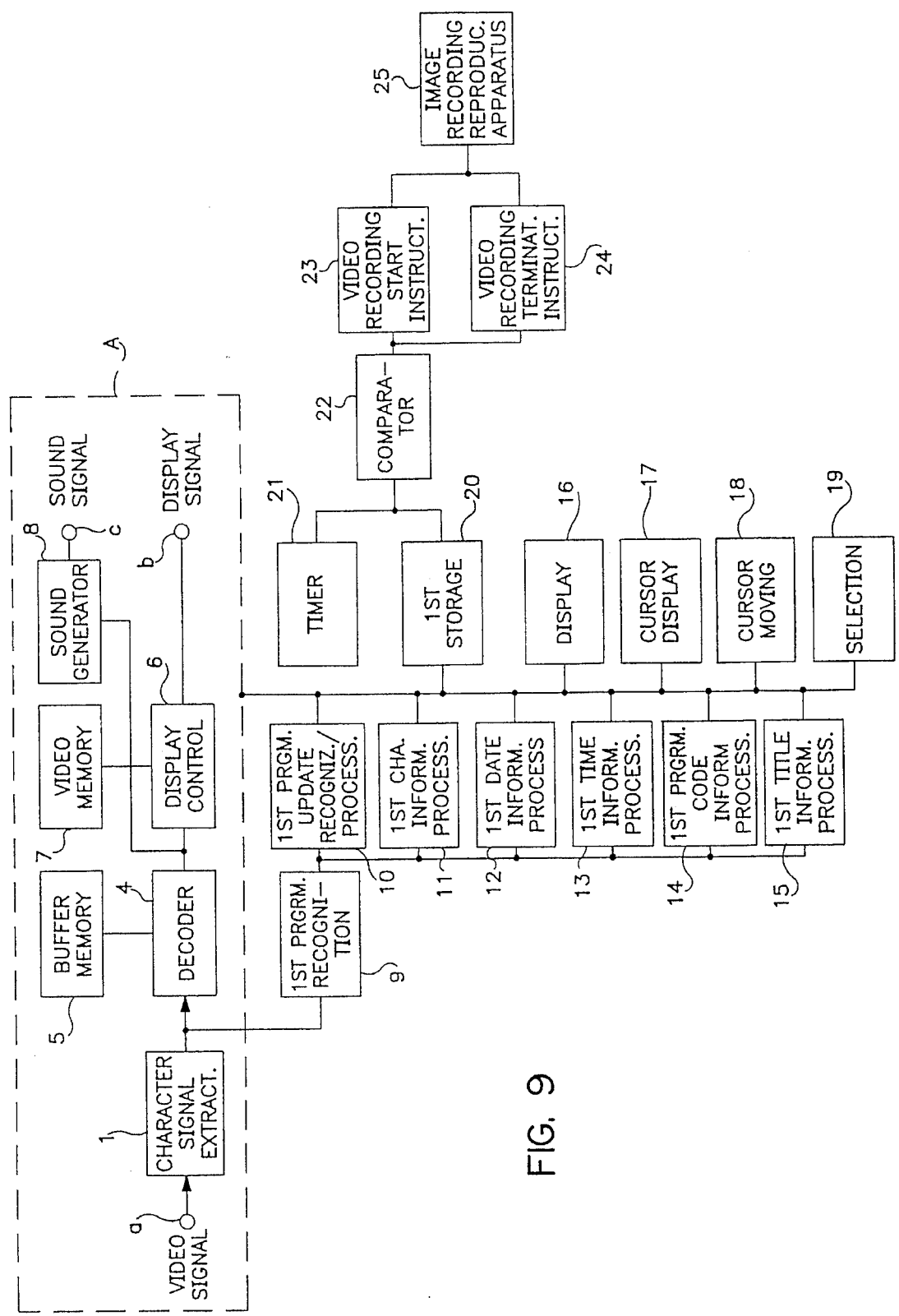
FIG. 9 is a functional block diagram showing the construction of a transmission system and a receiver according to an embodiment of the present invention.

FIG. 9 shows the construction of a receiver according to the first embodiment of the invention.

In FIG. 9, represented by reference character A is a reception means for receiving teletext in a coding transmission system. In the reception means A, designated by numeral 1 is a character signal extracting section for extracting character signals superimposed on the vertical blanking period from a video signal a; 4 is a decoder section for decoding the character signals extracted from the character signal extracting section 1 to develop into character graphics for display; 5 is a buffer memory section for accumulating only the character signals extracted at the character signal extracting section 1; 6 is a display control section for actually displaying display data developed into character graphics at the decoder section 4 on a screen or the like; 7 is a video memory section for storing display data to be actually displayed on the screen or the like by the display control section 6; and 8 is a sound generator section for performing actual sound generation according to added sound data decoded by the decoder section 4, all of which are designated by like numerals as in FIG. 1. Further, designated by numeral 9 is a first program recognition means for recognizing television-program table information from data-unit parameters; 10 is a first program update recognizing and processing means for recognizing and processing program-content update information from the data-unit data detected by the first program recognition means 9; 11 is a first channel information processing means for processing channel information from the data-unit data detected by the first program recognition means 9; 12 is a first date information processing means for processing date information from the data-unit data detected by the first program recognition means 9; 13 is a first time information processing means for processing time information from the data-unit data detected by the first program recognition means 9; 14 is a first program code information processing means for processing program code information from the data-unit data detected by the first program recognition means 9; 15 is a first title information processing means for processing title information from the data-unit data detected by the first program recognition means 9; 16 is a display means for displaying data processed by the first program update recognizing and processing means 10, the first channel information processing means 11, the first date information processing means 12, the first time information processing means 13, the first program code information processing means 14, and the first title information processing means 15, for example onto a CRT screen of the a television receiver; 17 is a cursor display means for displaying a cursor for each one program of the television programs displayed by the display means 16; 18 is a cursor moving means for moving the cursor displayed by the cursor display means 17 for each program; 19 is a selection means for selecting video-recording reservation of a television program designated by the cursor of the cursor display means 17; 20 is a storage means for storing television-program table information such as channel information, date information, time information, program code information, and title information of the television program selected by the selection means 19; 21 is a timer means for performing time management; 22 is a comparator means for comparing date information and time information of the video-recording reserved program stored in the storage means 20 with date information and time information of the timer means 21; 23 is a start instruction means for instructing an image recording/reproducing apparatus 25 to start a video-recording operation when date information and time information of the video-recording reserved program coincides with date information and time information of the timer means 21 by the comparator means 22; and 24 is a termination instruction means for instructing the image recording/reproducing apparatus 25 to terminate the video-recording operation when date information and time information of the video-recording reserved program coincides with date information and time information of the timer means 21 by the comparator means 22. In addition, numeral 25 denotes an image recording/reproducing apparatus such as a video tape recorder.

The receiver constructed as described above is below described with regard to its operation, referring to FIG. 9.

First, the character signal extracting section 1 extracts character signals superimposed on 14H, 15H, 16H, and 21H from the input video signal a. The decoder section 4 accumulates the character signals extracted at the character signal extracting section 1 in the buffer memory section 5 while it extracts program data pertaining to a program number needing presentation from the character signals accumulated in the buffer memory section 5, and it further performs the decoding of character signals such as shown in FIG. 8, writing character/graphic screen information into the video memory section 7 through the display control section 6. The display control section 6 sequentially reads the character/graphic screen information written into the video memory section 7, yielding an output of display signal b. The decoder section 4 further decodes added sound information, if there is any added sound information in the program data needing presentation, thereafter transmitting sound-generation data to the sound generator section 8. The sound generator section 8 yields an output based on the sound-generation data.

Figure 10:
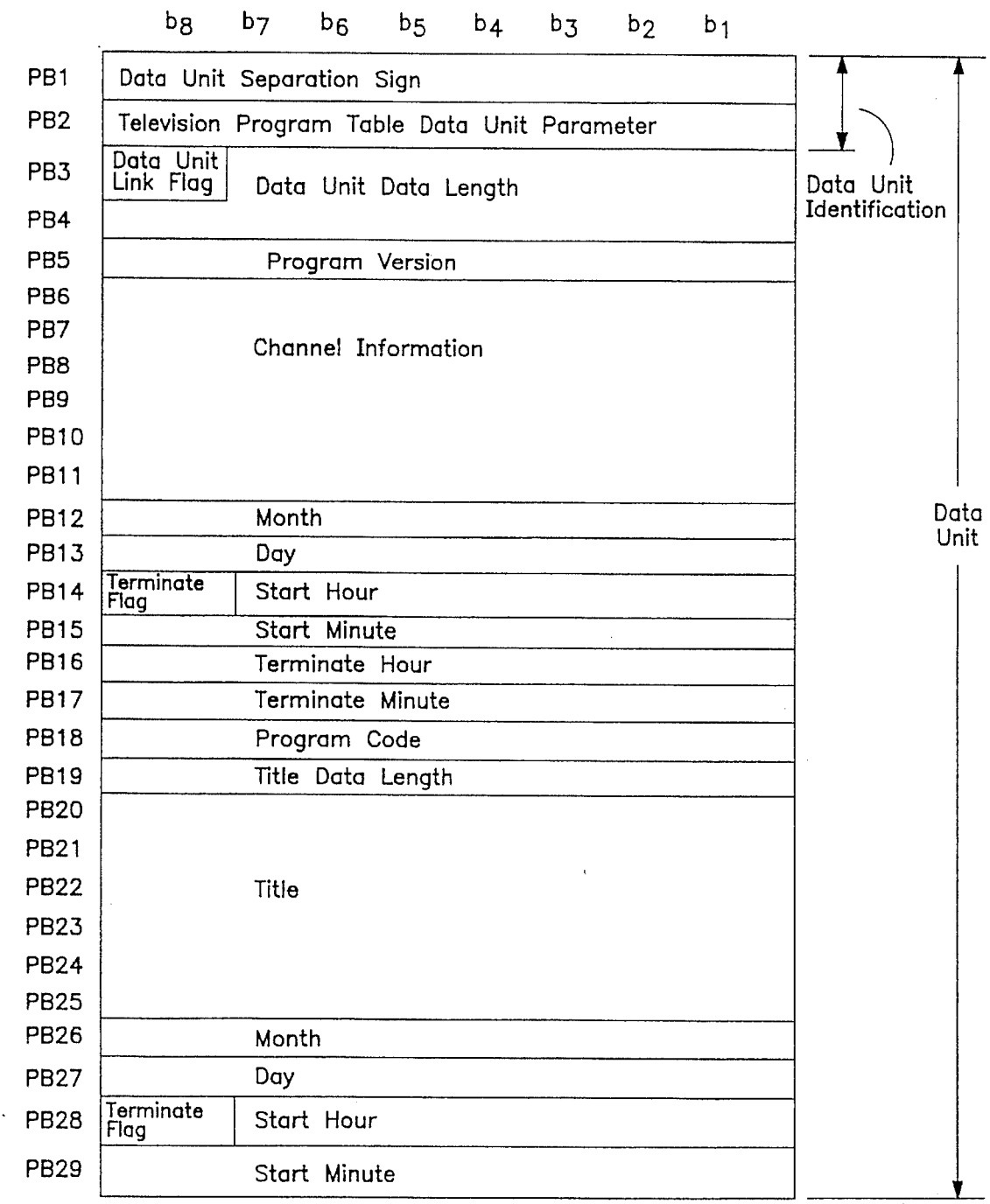
FIG. 10 is a view showing an exemplary structure of the television-program table program data unit.

The detection of television-program table programs is carried out by the first program recognition means 9. The recognition of television-program table programs is carried out by the data-unit parameters as shown in FIG. 7. The data-unit parameters representing television-program table programs are hexadecimal data, which may be any 1-byte data except 20, 24, 28, 2C, 30, 31, 32, 34, 35, 38, 39, 3B, 3C, 3D, 3E, and 3F. An example of the structure of the television-program table program data unit is shown in FIG. 10. Out of the television-program table data unit recognized and extracted by the first program recognition means 9, the first channel information processing means 11 reads channel information from byte-6 to byte-11 data of the television-program table data unit. The first program update recognizing and processing means 10 reads program version data from byte 5 of the television-program table data unit. The first date information processing means 12 reads month information from byte 12 and date information from byte 13 of the television-program table data unit. The first time information processing means 13 reads start hour information from byte 14 and start minute information from byte 15 of the television-program table data unit. By the MSB, b8 of byte 14, it is decided whether or not there exists any terminate time information. It also reads terminate hour information from byte 16 and terminate minute information from byte 17. When terminate time information is omitted, the data that follow are shifted by 2 bytes. The first program code information processing means 14 reads program code information from byte 18 of the television-program table data unit. The first program title information processing means 15 reads title information by the number of bytes representing title data-length data of byte 19 of the television-program table data unit. Similarly, it reads the second and following television-program table information data. The pieces of information read by the first program update recognizing and processing means 10, the first channel information processing means 11, the first date information processing means 12, the first time information processing means 13, and the first title information processing means 15 are each displayed onto the CRT screen through the display means 16. The cursor display means 17 displays a cursor representing a television program to be selected on the CRT screen, while the cursor moving means 18 moves the position of the cursor outputted by the cursor display means 17, thereby allowing a desired television program to be selected by the selection means 19. The selected television-program table information are stored in series in the first storage means 20. If any content of the television-program table information stored in the first storage means 20 are updated, a comparison is made between the content information of the relevant program and the contents of the television-program table information stored in the first storage means 20 through the first program update recognizing and processing means 10, where if there is any change in the contents, the contents of the television-program table information stored in the first storage means 20 is rewritten into new data. The contents of the television-program table information stored in the first storage means 20 are at all times compared with date and time data of the timer means 21 by the comparator means 22. Then, out of the television-program table information stored in the storage means 20, when the date and time data obtained by the first date information processing means 12 and the start time data obtained by the first time information processing means 13 coincide with each other, the start instruction means 23 instructs the image recording/reproducing apparatus 25 to start the video recording. Similarly, as for the instruction for termination of the video recording, the contents of the television-program table information stored in the first storage means 20 are at all times compared with date and time data of the timer means 21, followed by the processing. That is, among the television-program table information stored in the first storage means 20, when the date and time data obtained by the first date information processing means 12 and the terminate time data obtained by the first time information processing means 13 coincide with each other, the termination instruction means 24 instructs the image recording/reproducing apparatus 25 to terminate the video-recording operation.

As described above, according to the present embodiment, there are newly provided data-unit parameters for television-program table information by teletext in the coding transmission system, and in this arrangement program-content update information, channel information, date information, time information, program code information, title information, and the like of the television-program table information is transmitted as data-unit data. As a result, on the reception side, television-program table information can be automatically detected and displayed on a display unit; and a television program displayed on the screen can be simply reserved for video recording on an image recording/reproducing apparatus only by selecting a cursor; and information of teletext can be effectively utilized in the receiver equipment. Also, it is possible to follow up any change in television-program table information.

Next the transmission system and receiver according to a second embodiment of the present invention is described below with reference to the drawings.

Figure 11:
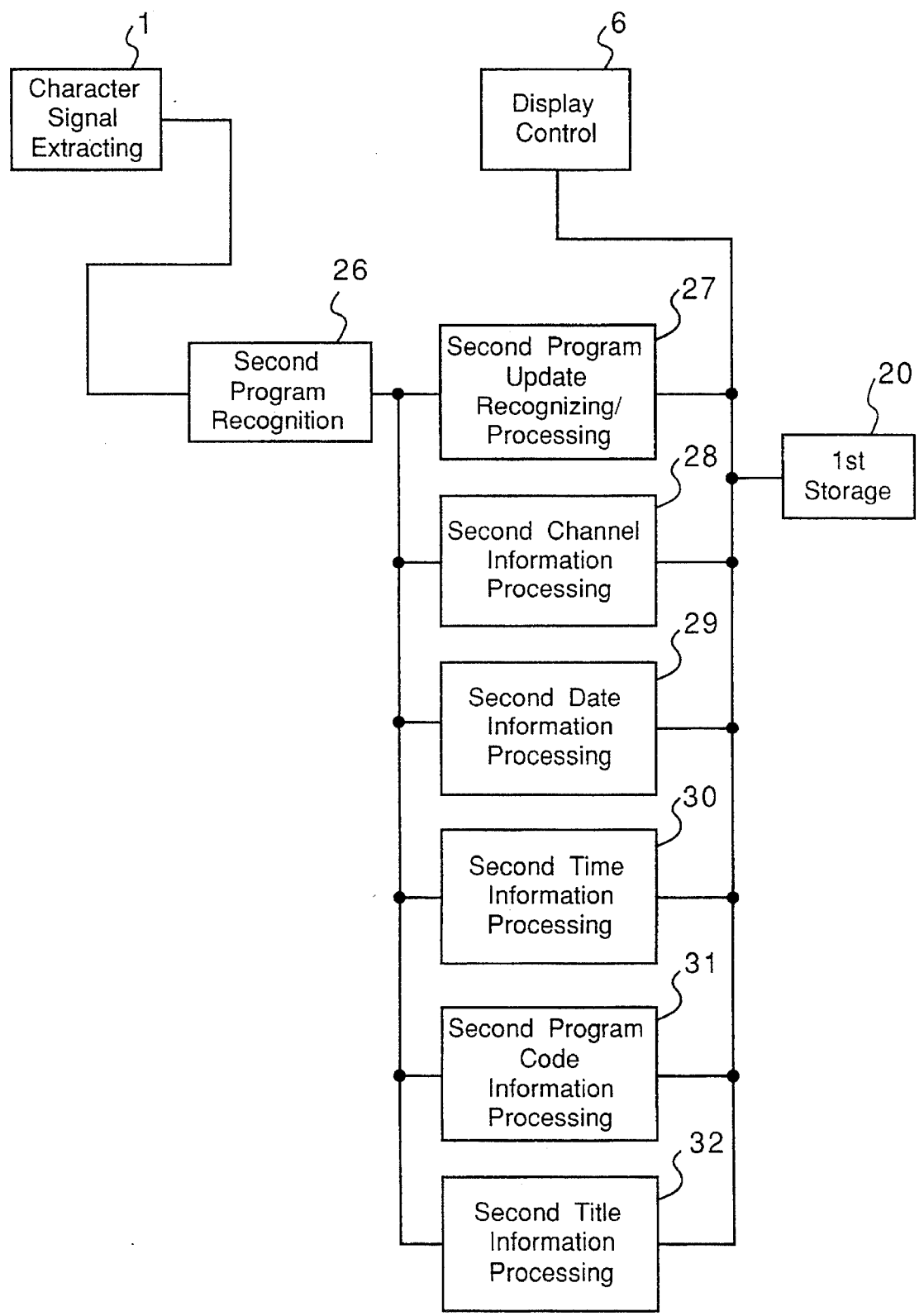
FIG. 11 is a functional block diagram of a receiver according to a second embodiment of the present invention.

FIG. 11 shows the construction of the main part of the receiver according to the second embodiment of the invention. The character signal extracting section 1, the display control section 6, and the first storage means 20 are the same as those in FIG. 9, correspondingly.

In FIG. 11, designated by numeral 26 is a second program recognition means for recognizing television-program table information from bit 3 of a page presentation device; 27 is a second program update recognizing and processing means for recognizing and processing program-content update information from bit 3, bit 4, bit 7, and bit 8 of the presentation update control detected by the second program recognition means 26; 28 is a second channel information processing means for processing channel information of the 1st character string on text line 1 from the television-program table information detected by the second program recognition means 26; 29 is a second date information processing means for processing date information of the 2nd character string on text line 1 from the television-program table information detected by the second program recognition means 26; 30 is a second time information processing means for processing time information from the television-program table information detected by the second program recognition means 26; 31 is a second program code information processing means for processing program code information from the television-program table information detected by the second program recognition means 26; and 32 is a second title information processing means for processing title information from the television-program table information detected by the second program recognition means 26.

Figure 12:
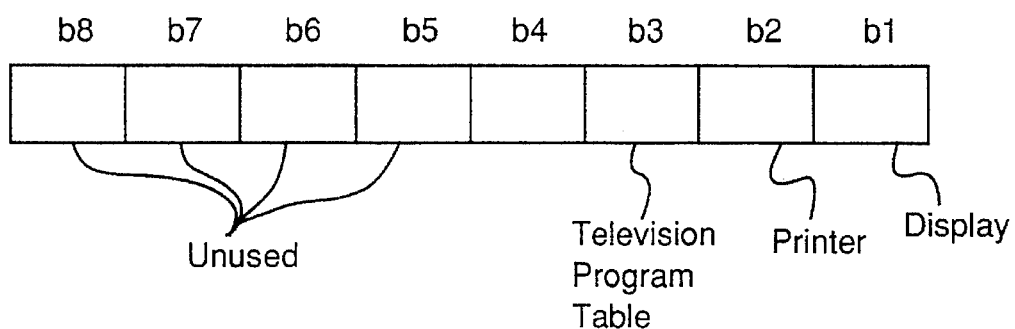
FIG. 12 is a view showing the bit assignment of a page presentation device.

The receiver constructed as described above is below described with regard to its operation with reference to FIGS. 11, 12, and 13.

The detection of a television-program table program is performed by the second program recognition means 26. The recognition of a television-program table program is performed by bit 3 of the page presentation device shown in FIG. 12. Bit 1 of the page presentation device designates whether or not a character program is to be presented on the display, while bit 2 designates whether or not a character program is to be presented on the printer. Bit 3 represents whether or not it is a television-program table program. Bits 4 to 8 are unused. The content update recognition of a television-program table program is performed by the second program update processing means 27.

Figure 13:
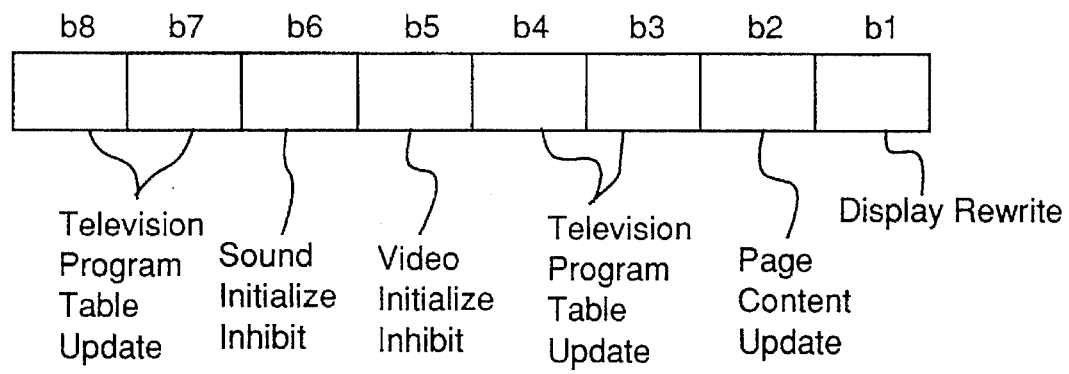
FIG. 13 is a view showing the bit assignment of presentation update control.

The content update recognition of a television-program table program is performed by bit 3, bit 4, bit 7, and bit 8 of the presentation update control shown in FIG. 13. Bit 1 of the presentation update control represents display rewrite, bit 2 page content updater bit 5 image initialize inhibit, bit 6 sound initialize inhibit, and bits 3, 4, 7, and 8 are treated as 4-bit data, which is television-program table update data for rendering one increment each time any program content is updated.

An example of the screen arrangement of a television-program table program is shown in FIG. 14. The second channel information processing means 28 recognizes a channel from "NHK," which is the channel information of the 1st character string on text line 1, out of the screen arrangement of the television-program table program recognized and displayed by the second program recognition means 26. The second date information processing means 29 recognizes a date from "12/1," which is the date information of the 2nd character string on text line 1, out of the screen arrangement of the television-program table program recognized and displayed by the second program recognition means 26. The second time information processing means 30 recognizes start time and terminate time from the 1st character string on each text line out of the screen arrangement of the television-program table program recognized and displayed by the second program recognition means 26. The second program code information processing means 31 recognizes 2-byte program code (represented by such numbers as "22," "23," . . . "27") that succeeds the time information out of the screen arrangement of the television-program table program recognized and displayed by the second program recognition means 26. The second title information processing means 32 recognizes the character string as the title information that follows the program code information and precedes the next time information out of the screen arrangement of the television-program table program recognized and displayed by the second program recognition means 26.

The rest of the operation is in principle the same as in the first embodiment.

As described above, according to the present embodiment, bits of a page presentation device are assigned for designation of television-program table programs by the teletext in the coding transmission system, 4 bits of the presentation update control are assigned for instruction on update of the television-program table information, and information such as channel information, date information, time information, program code information, and title information are recognized from the screen arrangement, whereby the television-program table information can be automatically detected and displayed on a CRT screen without newly defining data units. Moreover, only by selecting a television program displayed on the CRT screen by a cursor (represented by square frames surrounding a program code shown in FIG. 14), it is possible to simply render a video recording reservation of an image recording/reproducing apparatus contributing to effective use of information on teletext at the receiver. Of course, it also follows up any change in the television-program table information.

Next the transmission system and receiver according to a third embodiment of the present invention is described below with reference to the drawings.

Figure 15:
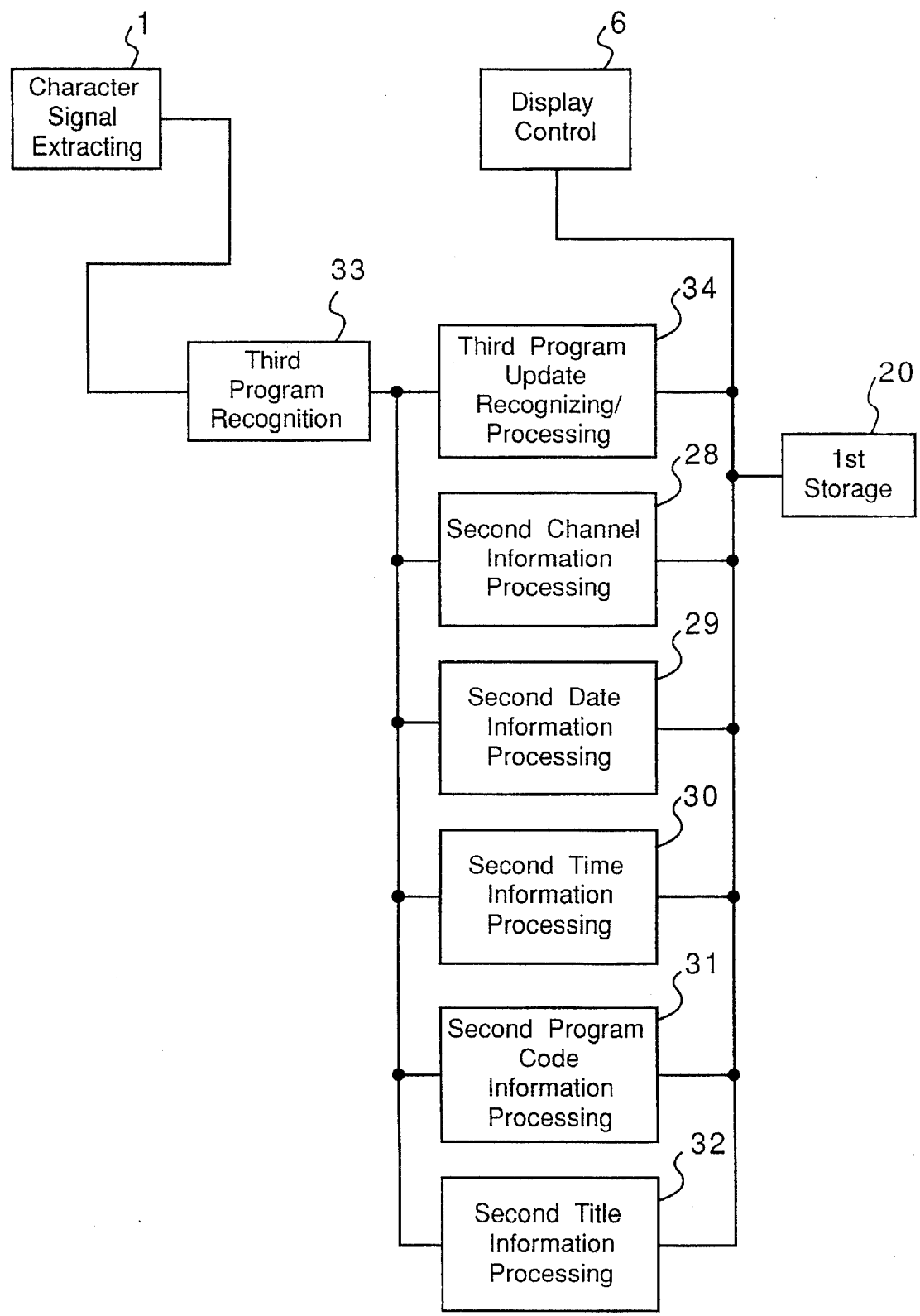
FIG. 15 is a functional block diagram of a receiver according to a third embodiment of the present invention.

FIG. 15 shows the structure of the main part of a receiver according to the third embodiment of the invention. The character signal extracting section 1, the display control section 6, the first storage means 20, the second channel information processing means 28, the second date information processing means 29, the second time information processing means 30, the second program code information processing means 31, and the second title information processing means 32 are the same as those in FIG. 9 and FIG. 11.

In FIG. 15, designated by numeral 33 is a third program recognition means for recognizing television-program table information from program numbers of fixed television-program table information; and 34 is a third program update recognizing and processing means for recognizing and processing update of program contents from the contents of the display screen of the television-program table information detected by the third program recognition means 33.

The receiver constructed as described above is below described with regard to its operation with reference to FIG. 15.

The detection of a television-program table program is performed by the third program recognition means 33 which detects the fixed program numbers of the television program table information. The recognition of content update of a television-program table program is performed by the third program update recognizing and processing means 34. For recognition of update of television-program table information, it is decided whether any update has occurred or not, based on an arrangement that the program code of the program reserved for video recording in such a manner as in the first embodiment in FIG. 14 is stored in correspondence to its relevant time information and title information.

The rest of the operation is in principle the same as in the first and second embodiments.

As described above, according to the present embodiment, fixed program numbers are assigned for designation of television-program table programs on teletext in the coding transmission system, and instruction on update of the television-program table information is performed with the screen arrangement and recognized from difference in the time information or title information corresponding to a program code, whereby television-program table information can be automatically detected and displayed on the CRT screen without newly defining data units or newly making bit assignments. Also, television programs displayed on the CRT screen can be simply reserved for video recording on an image recording/reproducing apparatus only by selecting the television program with the cursor, allowing the information on teletext to be effectively utilized on the receiver. In addition, it can follow up any change in the television-program table information.

Figure 16:
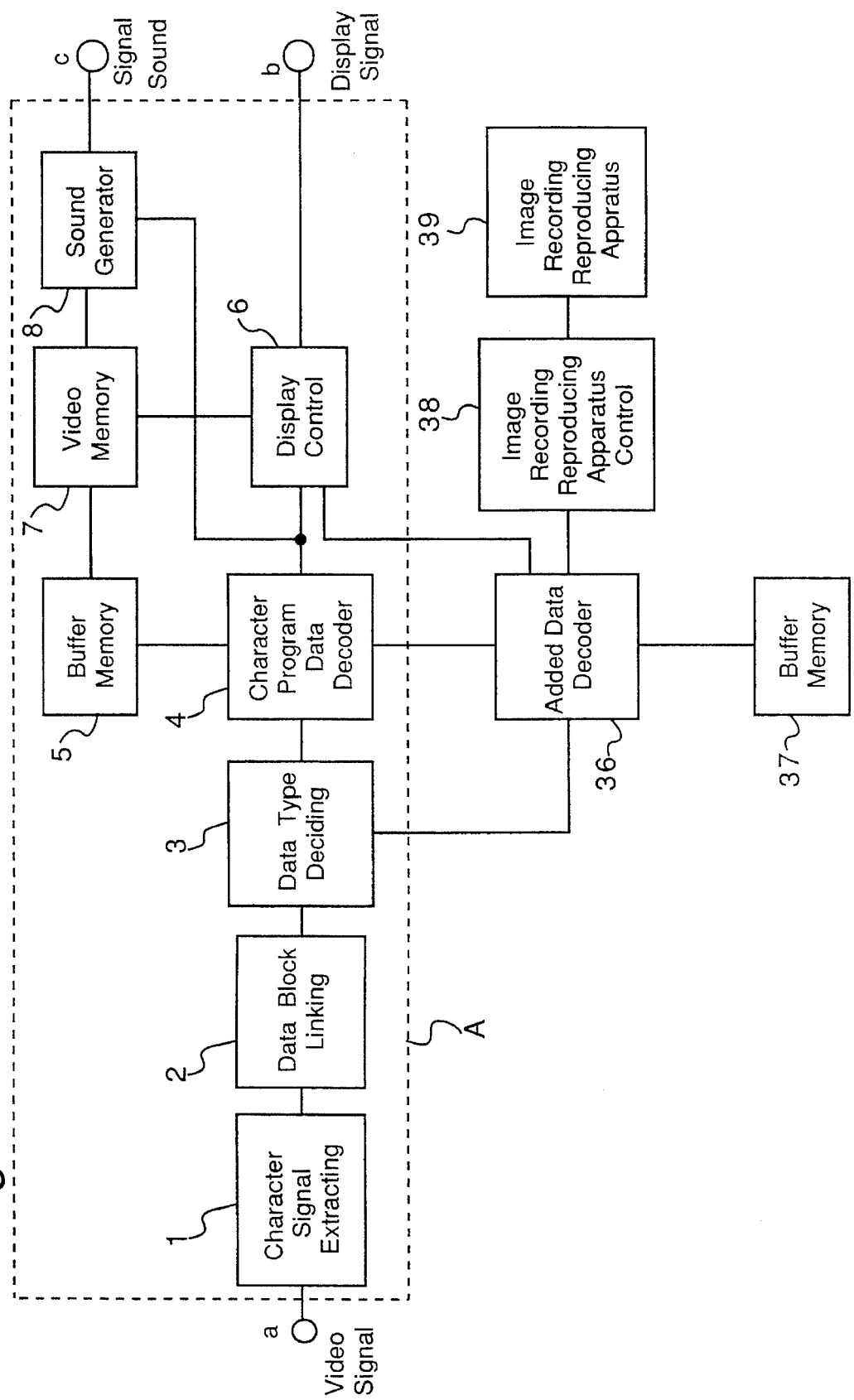
FIG. 16 is a functional block diagram of a receiver according to a fourth embodiment of the present invention.

Next a fourth embodiment of the present invention is described referring to FIG. 16. The transmission system of the present embodiment is of the signal arrangement of teletext in the coding transmission system in which first at the data group header section, a sign for identifying that it is added service data is newly assigned to a data group identification sign that serves to identify program management data or page data and program index data. Further at the data header section, a channel identification number for identifying a broadcasting channel, a program content update index for notifying any update of program contents, and a program broadcasting date for showing the broadcasting date of a program are added as data, while a parameter for identification of being a data header related to added services is newly assigned to the data header parameters for identifying a program data header, a page header, and a program search data header. Furthermore at the data unit section, there are added television-program identification numbers for identifying each television program to be broadcast a day, program broadcasting start time, program broadcasting terminate time, program-classification identification indexes for showing the Glass of a program content, and program title data length for showing the data length of a program title, as program title data, while to the data-unit parameters for identifying the type of a data unit such as text, header text, and added sound information there is newly assigned a parameter for identifying that it is added service data, whereby all of these data are transmitted.

In FIG. 16, reference character A denotes a receiver means for receiving teletext in the coding transmission system. In this receiver means A, designated by numeral 1 is a character signal extracting section for extracting character signals superimposed in the vertical blanking periods from the video signal a; 2 is a data block linking section for linking the character signals in the units of data blocks extracted by the character signal extracting section 1 and classifying them into data groups; 3 is a data type deciding section for deciding whether the data groups classified by the data block linking section 2 are character-program data or added data; 4 is a character-program data decoder section for decoding the signals decided as character-program data by the data type deciding section 3 to develop them into character graphics for display; 5 is a buffer memory section for accumulating the signals decided as character-program data by the data type deciding section 3; 36 is an added data decoder section for decoding the signals decided as added data by the data type deciding section 3 and developing them into character graphics for display; 37 is a buffer memory section for accumulating the signals decided as added data by the data type deciding section 3; 38 is an image recording/reproducing apparatus control section for generating a control signal to an image recording/reproducing apparatus 39 by control information obtained by the added data decoder section 36; 6 is a display control section for actually displaying display data developed into character graphics at the character-program data decoder section 4 and the added data decoder section 36, onto a screen or the like; 7 is a video memory section for storing display data to be actually displayed onto a screen or the like by the display control section 6; and 8 is a sound generator section for actually generating sounds according to added sound data decoded by the character program data decoder section 4.

Figure 17:
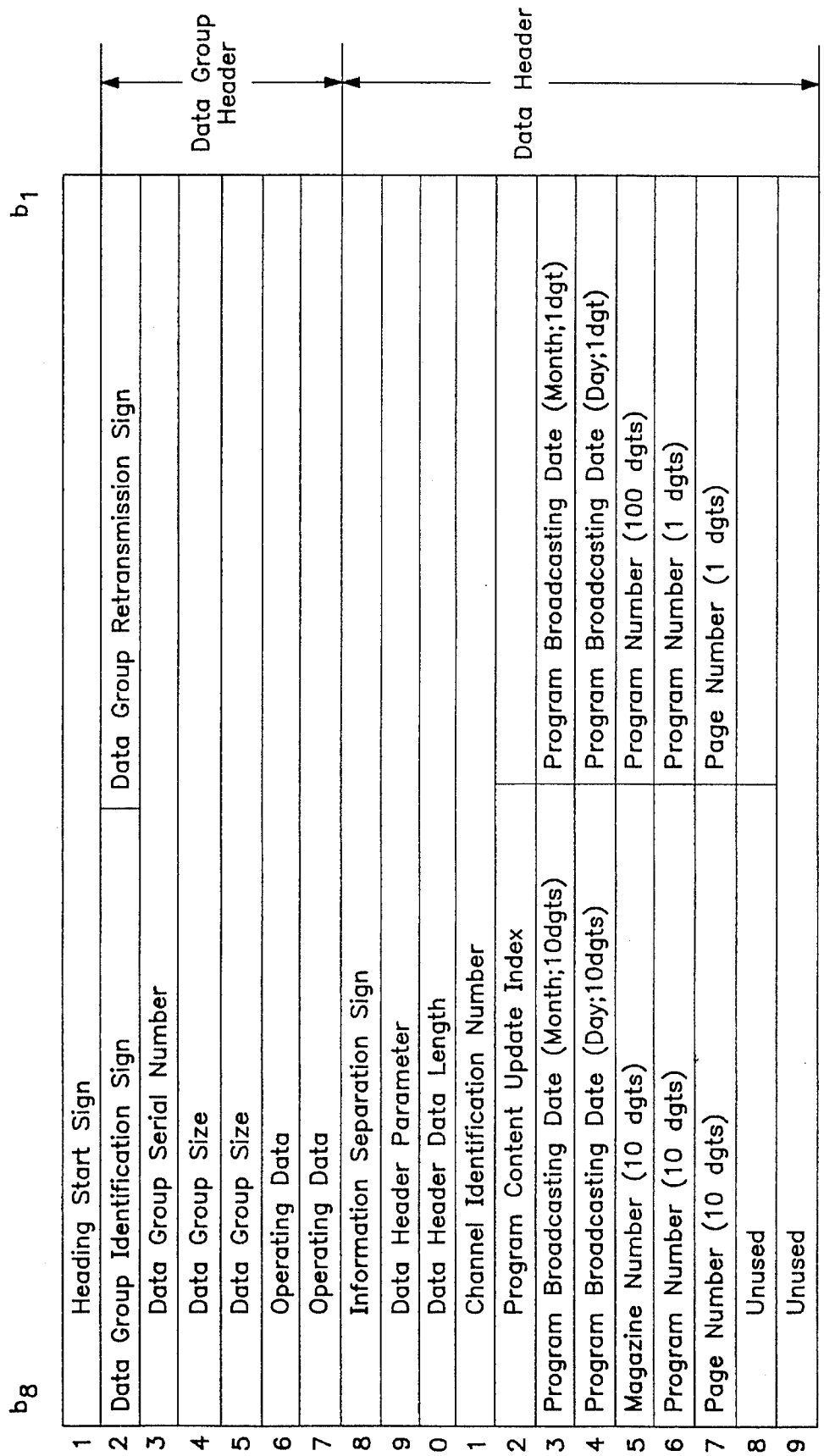
FIG. 17 is a schematic view showing the structure of the data group header and data header of data to be transmitted to the same receiver and the transmission procedure thereof.
Figure 18:
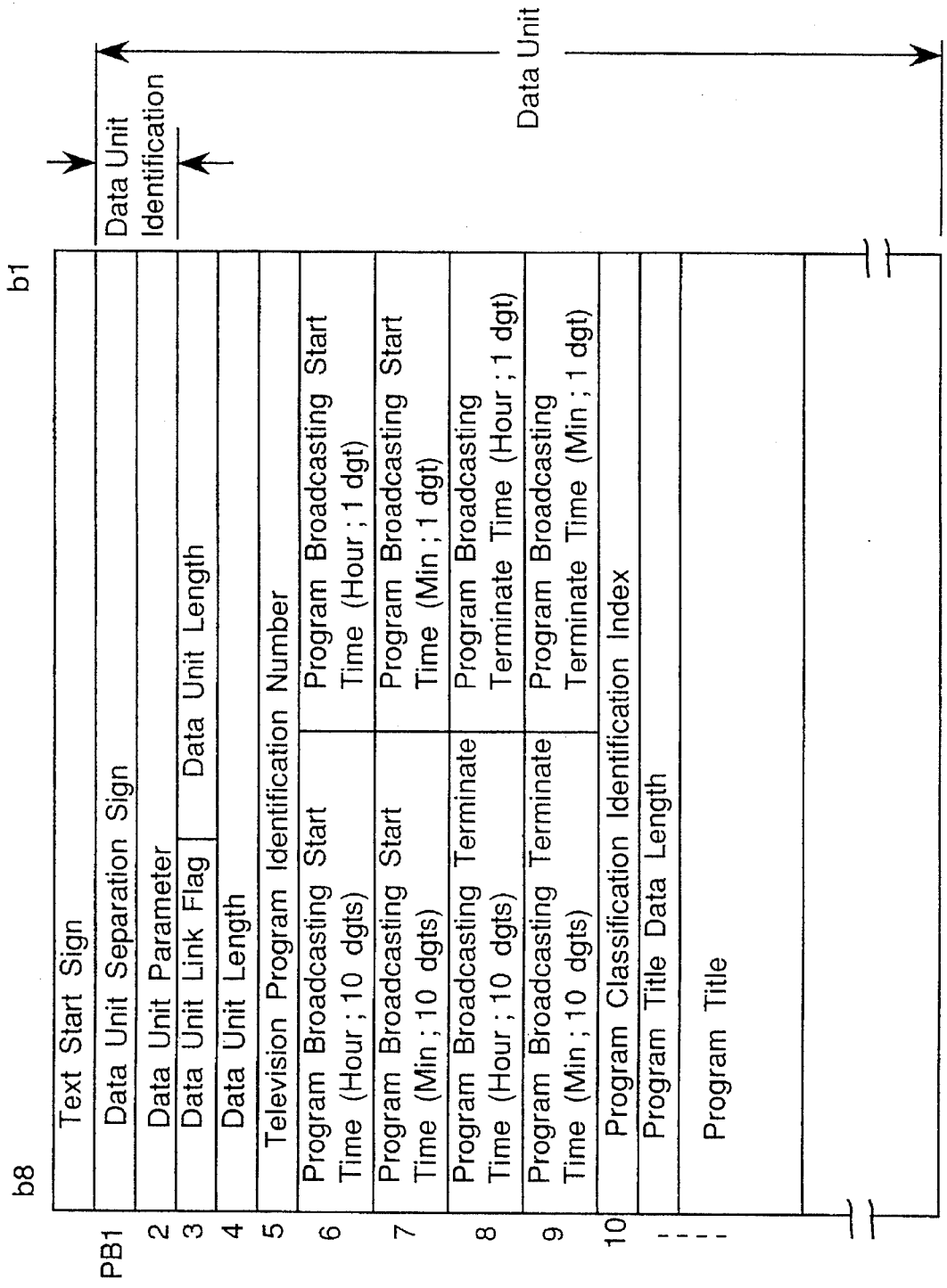
FIG. 18 is a schematic view showing the structure of the data unit of the same data and the transmission procedure thereof.

FIG. 17 shows the structure of the data group header and data header on teletext of the present invention and its transmission procedure, while FIG. 18 shows the structure of the data unit in the same teletext and its transmission procedure.

In FIG. 17, at the data header section, a channel identification number for identifying broadcast channels, a program-content update index for notifying update of program contents, and a program broadcasting date representing the broadcasting date of programs are added as data. Also, at the data group header section, a sign for identification of being added service data is newly assigned to a data group identification sign, while at the data header section a parameter for identification of being a date header related to added services is newly assigned to the data header parameters individually. In this case, the data group identification sign for identifying that it is added service data is hexadecimal data, i.e., 4-bit data except 0 and F. Also, the data header parameter for identification of being a data header related to added services is hexadecimal data, which may be any 1-byte data except 20, 21, 22, and 23.

In FIG. 18, at the data unit section, a television-program identification number for identifying each television program to be broadcasted a day, program broadcasting start time, program broadcasting terminate time, a program-classification identification index for representing the class of the contents of a program, a program title data length for representing the data length of a program title, and a program title are added as data. Further, a parameter for identification of being added service data is newly assigned to the data-unit parameters for identifying the type of a data unit such as text, header text and added sound information. In this case, the data-unit parameter for identification of being added service data is hexadecimal data, which may be any 1-byte data except 20, 24, 28, 2C, 30, 31, 32, 34, 35, 38, 39, 3B, 3C, 3D, 3E, and 3F.

The receiver constructed as described above is below described with regard to its operation, referring to FIGS. 16 to 18.

First, as in the signal reception processes of the conventional teletext, character signals superimposed on 14H, 15H, 16H, and 21H of the vertical blanking periods of a television signal are extracted from an input video signal a at the character signal extracting section 1. The data block linking section 2 picks up data blocks out of the character signals extracted by the data signal extracting section 1 and thereafter links and classifies them into data groups. The data type deciding section 3 decides whether the data groups classified by the data block linking section 2 are character-program data or added data, according to their data group identification signs, and then the character-program data, if so decided, is processed for decoding at the character-program data decoder section 4, while the added data, if so decided, is processed for decoding at the added data decoder section 36.

The processing that follow branches here into character-program data processing and added data processing. First described is the character-program data processing.

After decided as character-program data at the data type deciding section 3, the output signal from the data type deciding section 3 is put into the character-program data decoder section 4. The character-program data decoder section 4 accumulates the character-program data from the data type deciding section 3 into the buffer memory section 5 while it extracts character-program data of the program number needing presentation from the character-program data accumulated in the buffer memory section 5 and then it decodes the character signal as shown in FIG. 8, whereby the character/graphic screen information is written into the video memory section 7 through the display control section 6. The display control section 6 sequentially reads the character/graphic screen information written into the video memory section 7, thus yielding an output of display signal b. Moreover, if there is any added sound information in the program data needing presentation, the character-program data decoder section 4 decodes the added sound information, transmitting sound generation data to the sound generator section 8. The sound generator section 8 produces a sound signal according to the sound generation data.

Next, the added data processing is described. After decided as added data by the data type deciding section 3, the output signal from the data type deciding section 3 is put into the added data decoder section 36. The added data decoder section 36 accumulates the added data from the data type deciding section 3 in the buffer memory section 37, while it extracts added data needing presentation from the added data stored in the buffer memory section 37, where it is decoded. The procedure for accumulating added data into the buffer memory section 37 comprises: reading the program-content update index, starting with byte 12, if it is identified as added data with the data header parameter (see FIG. 17); and comparing it with the previously read index. Then if they are identical to each other, it is decided that there has been no change in program contents, and thus the transmitted television-program table information is invalidated. If not identical, it is decided that there has been some change in program contents, in which case the presently transmitted television-program table information is accumulated as television-program table information in the buffer memory section 37.

Further, the procedure for decoding added data is below described. It is assumed here that a selected piece of television-program table information is the first program. If it is decided as added data by the data header parameter at the data header section, the channel identification number from byte 11 and the program broadcasting date of two bytes from byte 13 are picked up as information (see FIG. 17). Then if it is decided as added data by the data-unit parameter at the data unit section, the television-program identification number pertaining to the first program from the fifth byte, the program broadcasting start time pertaining to the first program of 2 bytes starting with byte 6, the program broadcasting terminate time pertaining to the first program of two bytes starting from eighth byte 8, the program-classification identification index pertaining to the first program starting from the tenth byte 10, the program title data length pertaining to the first program starting from the eleventh byte 11, and program title pertaining to the first program starting from the twelfth byte 12 are picked up as information (see FIG. 18). The television-program table information picked up are put into the image recording/reproducing apparatus control section 38, where the image recording/reproducing apparatus control section 38 produces an image recording/reproducing apparatus control signal thereby to control the image recording/reproducing apparatus 39. If there is any data for the second and following programs, the data for the second and following program are recorded as repetition of data similar to that pertaining to the first program on the buffer memory section 37.

As described above, according to the present embodiment, there are newly assigned a data group identification sign, a data header parameter, and a data-unit parameter pertaining to added data according to teletext in the coding transmission system, and in this arrangement, program-content update information, channel information, date information of the television-program table information are transmitted as data-header data while time information, program type information, title information, and the like are transmitted as data-unit data, whereby the television-program table information can be automatically detected and displayed onto a CRT screen, allowing a television program to be reserved for video recording on an image recording/reproducing apparatus only by selecting the television programs displayed on the CRT screen, which contributes to making effective use of the teletext information on the receiver.

Figure 19:
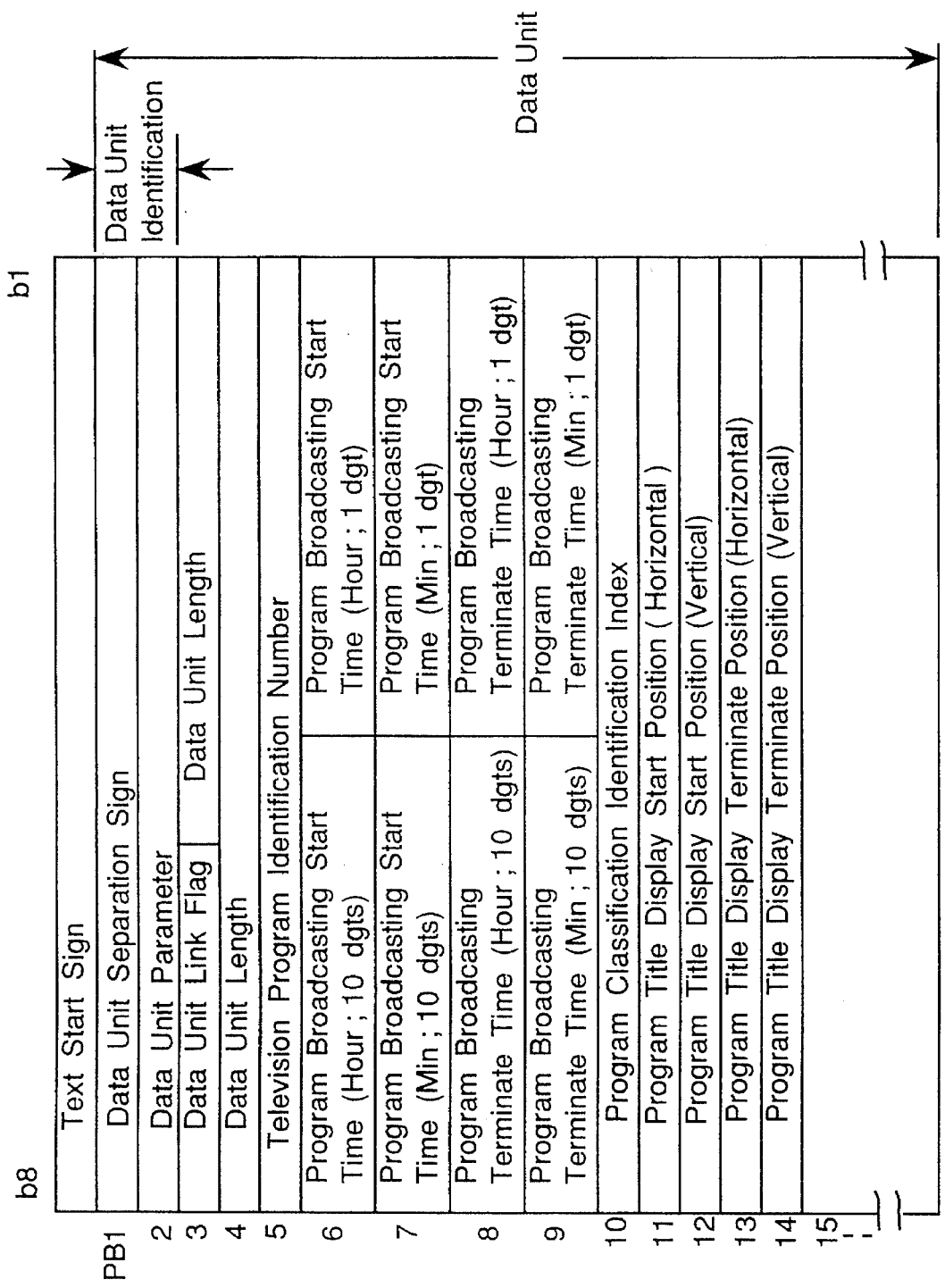
FIG. 19 is a view for explaining a fifth embodiment of the invention, schematically showing another structure of the same data unit and the transmission procedure thereof.

Next, the transmission system of a fifth embodiment of the present invention is described with reference to FIG. 16, FIG. 17, and FIG. 19. FIG. 19 shows the structure of a data unit in the fifth embodiment of the invention and its transmission procedure.

With respect to the processing, this embodiment is equal in most part to that of the fourth embodiment. The difference exists in that while program title data length and program title themselves are transmitted in the fourth embodiment, the arrangement in this fifth embodiment is such that data of program title display start position and display terminate position in terms of horizontal and vertical relation on the screen are transmitted when program title data is displayed on the screen. This causes the receiver equipment side to be different in the way the program title data is picked up. In the fifth embodiment having such an arrangement, 2-byte data is picked up from each of byte 11 and byte 13 of the data unit section as the data of program title display start position and display terminate position, respectively, so that a program title data selected from the data and the program title data decoded by the character-program data decoder section 4 is picked up. By carrying out the rest of the processing in the same manner as in the fourth embodiment, the same processing can be accomplished as in the fourth embodiment, as the whole system.

With the arrangement as described above, the result is such that, while the compatibility with the conventional teletext receiver equipment is maintained, program title data transmitted as character-program data is utilized instead of program title data itself as program title data information, and there are transmitted, as added data, the data of program title display start position and display terminate position in horizontal and vertical relation on the screen when the program title data is displayed on the screen as character-program data, allowing to reduce the amount of data to be transmitted.

The transmission system of a sixth embodiment of the present invention is now described with reference to FIG. 16, FIG. 17, and FIG. 20.

FIG. 20 shows the structure of the data unit in the sixth embodiment of the invention and its transmission procedure. As understood from FIG. 20, the sixth embodiment in contrast to the structure of the data unit in the fourth embodiment is so arranged that it involves added data lengths, added data control, and added data that is the relevant data content. The added data lengths represent the program broadcasting start time, program broadcasting terminate time, program-classification identification index, program title data length, and data lengths of added data other than program title in the television program corresponding to the television-program identification number. The number of bytes of the added data to be transmitted succeeding to the added data lengths is transmitted by the succeeding byte in binary value. The added data control, which represents the type of the added data of the television program corresponding to the television-program identification number and which represents by each bit whether its added data is present or not, is transmitted by the byte succeeding to the added data lengths. Examples of the added data include data which gives information on programs in series when one television program is broadcasted in series over a plurality of broadcasting channels.

With the above-described arrangement, in addition to television-program identification number, program broadcasting start time, program broadcasting terminate time, program-classification identification index, program title data length, program title, program title display start position, and program title display terminate position, it is possible to further provide added data lengths representing data lengths of television-program table information to be added other than the above-described data, added data control representing the type of the data to be added unless the added data length is 0 (i.e. when there is any television-program information to be added), and added data that is the content of the relevant data, to the data unit section for each television-program number, and transmit them. As a result, it is made feasible to make various types of added data, which may be possible in the future, expandable while the compatibility with the conventional teletext receiver equipment is maintained.

Figure 21:
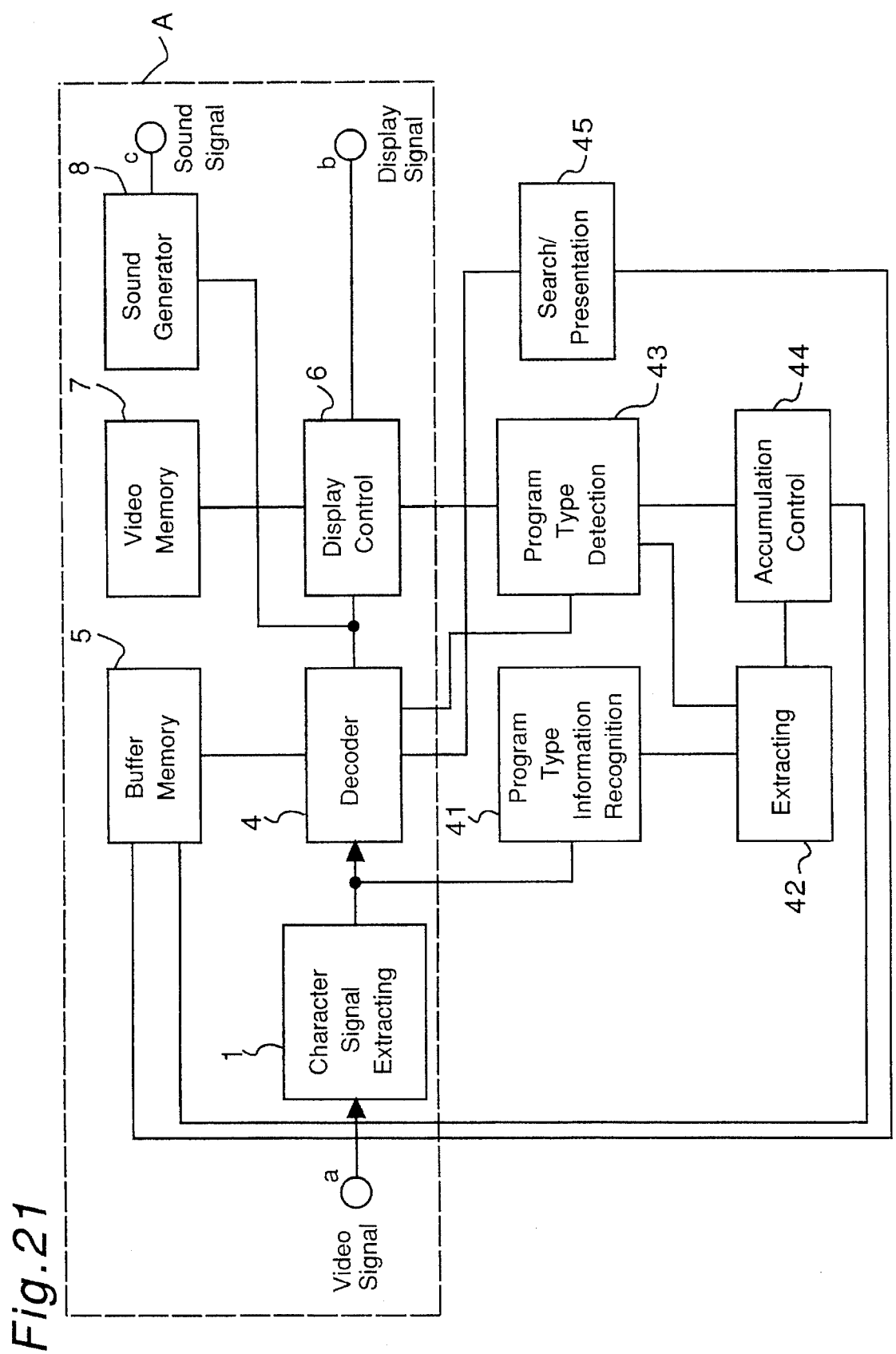
FIG. 21 is a functional block diagram of a receiver according to a seventh embodiment of the invention.

FIG. 21 shows a seventh embodiment of the present invention.

With the arrangement of the existing teletext transmission system and its receiver as shown in FIG. 1, to select a related teletext program or page, it is necessary to designate and call the menu screen and further designate program number and page number while viewing the menu screen. This involves a problem that the character programs accumulated in the memory are limited to those of program numbers and page numbers that are at random or that have previously been designated.

To solve this problem, the seventh embodiment comprises: program type information recognition means for providing a limitation on program type information and recognizing that a relevant data unit is of program type information from a received data-unit parameter; extraction means for extracting magazine number, program number, page number, program type, and the like from a data-unit data detected by the program type information recognition means; program type detection means for detecting program type of a character program or page selected and displayed; accumulation control means for accumulating in a memory, with priority, a character program or page identical or related to the program type detected by the program type detection means; and search and presentation means for searching and presenting a character program or page identical or related to the program type detected by the program type detection means of the character program or page selected and displayed according to request for presentation of programs related to the character program or page selected and displayed.

With the above-described arrangement, when program type information of character broadcasting programs such as news, weather, and stock market are transmitted, it is possible to manage character broadcasting programs for each program type by making use of received program type information, accumulates with priority character programs or pages of related program types, and search and present character programs or pages of related program types without designating program numbers.

Figure 22:
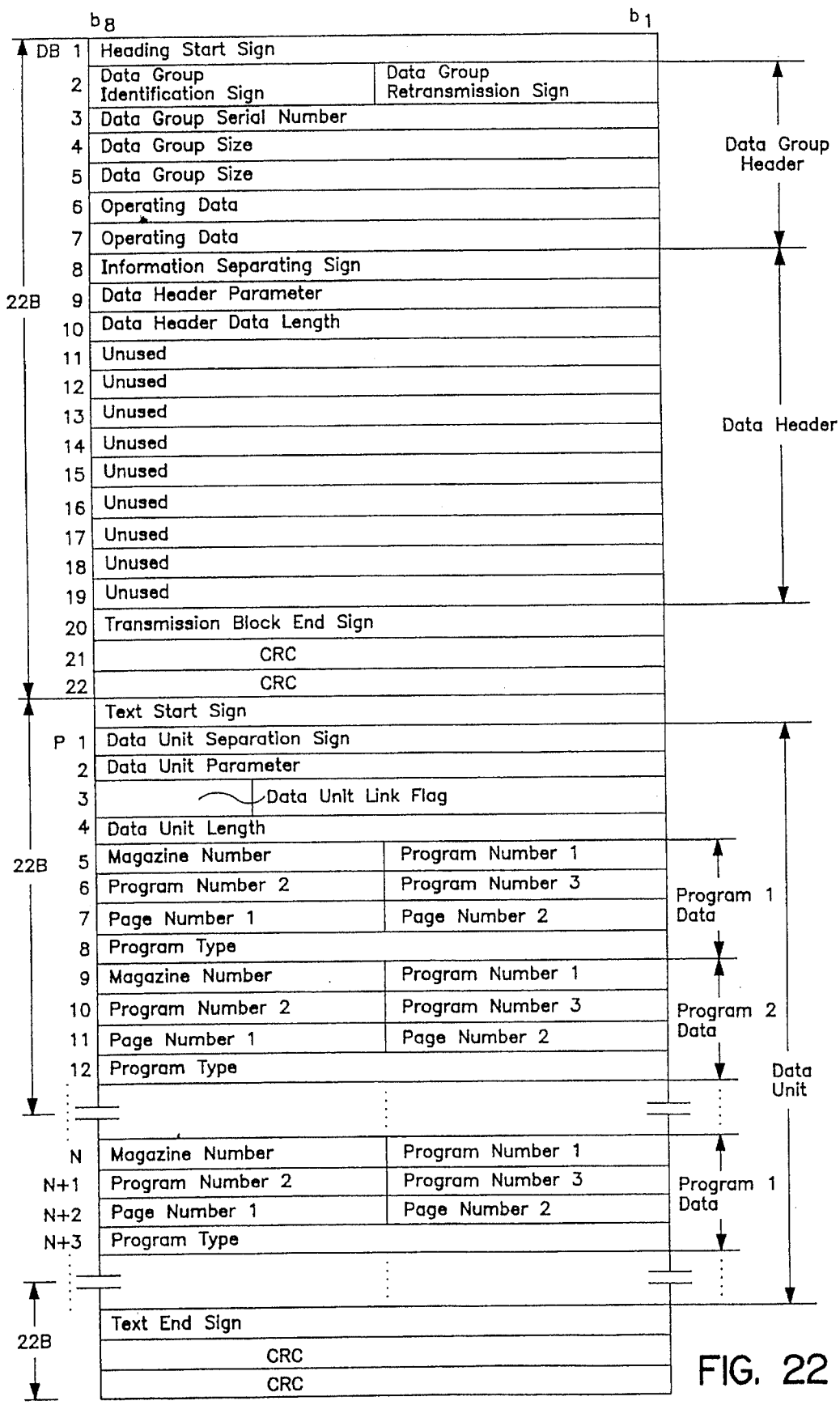
FIG. 22 is a view for explaining the operation in FIG. 21, schematically showing an example of the structure of a data group of program type information.

Now the seventh embodiment is described in more detail with reference to FIG. 21 and FIG. 22.

In FIG. 21, A denotes a reception means for receiving teletext in the coding transmission system. In this reception means A, designated by numeral 1 is a character signal extracting section for extracting character signals superimposed on vertical blanking periods from a video signal a; 4 is a decoder section for decoding the character signals extracted from the character signal extracting section 1 and developing them into character graphics for display; 5 is a buffer memory section for accumulating only the character signals extracted by the character signal extracting section 1; 6 is a display control section for actually displaying display data developed into character graphics at the decoder section 4 onto a screen or the like; 7 is a video memory section for storing display data to be actually displayed onto the screen or the like by the display control section 6; and 8 is a sound generator section for actually performing sound generation according to the added sound data decoded by the decoder section 4. Also, designated by numeral 41 is a program type information recognition means for recognizing that a relevant data unit is of program type information from a data-unit parameter delivered from the reception means A; 42 is a extraction means for extracting magazine number, program number, page number, program type, and the like from data-unit data detected by the program type information recognition means 41; 43 is a program type detection means for detecting program type of a character program or page selected and displayed; 44 is an accumulation control means for accumulating in a memory with priority a character program or page identical or related to the program type detected by the program type detection means 43; and 45 is a search and presentation means for searching and presenting a character program or page identical or related to the program type detected by the program type detection means 43 of the character program or page selected and displayed according to request for presentation of programs related to the character program or page selected and displayed.

The receiver constructed as described above is below described with regard to its operation.

First, the character signal extracting section 1 extracts character signals superimposed on 14H, 15H, 16H, and 21H from an input video signal a. The decoder section 4 accumulates the character signals extracted by the character signal extracting section 1 in the buffer memory section 5 while it extracts program data of the program number needing presentation from the character signals accumulated in the buffer memory section 5. Then it decodes the character signals as shown in FIG. 8, writing character/graphic screen information into the video memory section 7 through the display control section 6. The display control section 6 reads in series the character/graphic screen information written into the video memory section 7, yielding an output of a display signal b. Further, the decoder section 4 decodes added sound information, if any in the program data needing presentation, transmitting sound generation data to the sound generator section 8. The sound generator section 8 produces a sound signal based on the sound generation data.

The detection of program type information is performed by the program type information recognition means 41. The recognition of program type information is performed by a data-unit parameter as shown in FIG. 7. The data-unit parameter representing program type information is hexadecimal data, which may be any 1-byte data except 20, 24, 28, 2C, 30, 31, 32, 34, 35, 38, 39, 3B, 3C, 3D, 3E, and 3F. An example of the structure of data group of program type information is shown in FIG. 22. Out of a program type information data unit recognized by the program type information recognition means 41, the extraction means 42 reads magazine number from PB 5 and PB 6 of the data unit of the program type information data group, reads page number from PB 7, and reads program type from PB 8. It also reads from PB 9 and the following in the same manner. The program type detection means 43 picks up the magazine number, program number, and page number of the character program currently presented from the decoder section 4, and detects by the extraction means 42 a program type coincident with the magazine number, program number, and page number picked up. The accumulation control means 4 controls the buffer memory section 5 so that it accumulates with priority character programs of program numbers or page numbers identical or related to the program information detected by the program type detection means 43. The search and presentation means 45 searches character programs or pages identical or related to the program type detected by the program type detection means 43 of the character program or page selected and displayed according to request for presentation of programs related to the character program or page selected and displayed. Thus, relevant character-program data is delivered from the buffer memory section 5 to the decoder section 4, so that it is presented through the display control section 6.

As described above, according to the present embodiment, there are newly provided data-unit parameters for program type information by teletext in the coding transmission system, wherein magazine number, program number, page number, program type, and the like of the program type information are transmitted as data-unit data. As a result, on the reception side, it is possible to manage character broadcasting programs for each program type by making use of the received program type information, so that character programs or pages of related program types are accumulated in the memory with priority or that character programs or pages of related program types can be searched and presented without designating program numbers.

Now an eighth embodiment of the present invention is described. This embodiment provides a receiver in which time information such as year information, month information, day information, hour information, minute information, and second information are defined when in transmission, and in which time information is recognized and processed so that on the reception side time setting and time correction for year, month, day, minute, second, and the like are automatically performed by making use of the received time information.

Therefore, the present embodiment comprises: time information recognition means for providing a limitation on time information and recognizing that a relevant data unit is of time information from a received data unit parameter; time information processing means for processing time information such as year information, month information, day information, hour information, minute information, and second information from the data-unit data detected by the time information recognition means; and time information setting means for automatically setting time information such as year information, month information, day information, hour information, minute information, and second information obtained by the time information processing means.

With such an arrangement, it is possible to automatically detect time information data out of character broadcasting program data, and automatically perform time setting and time correction for year, month, day, hour, minute, second, and the like.

The transmission system and receiver of the eighth embodiment of the invention is described in more detail with reference to FIG. 23 and FIG. 24.

Figure 23:
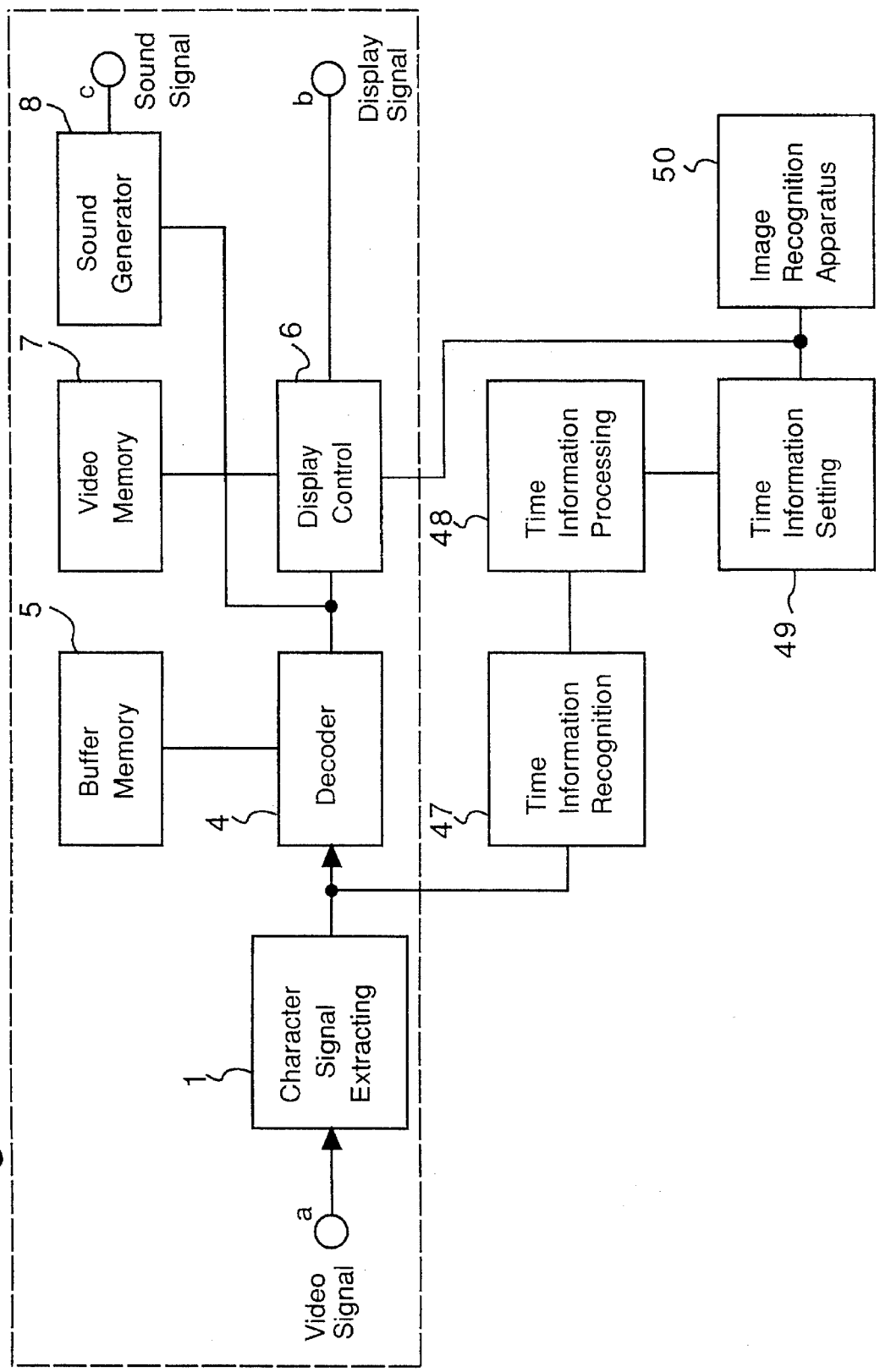
FIG. 23 is a functional block diagram of a receiver according to an eighth embodiment of the invention.
Figure 24:
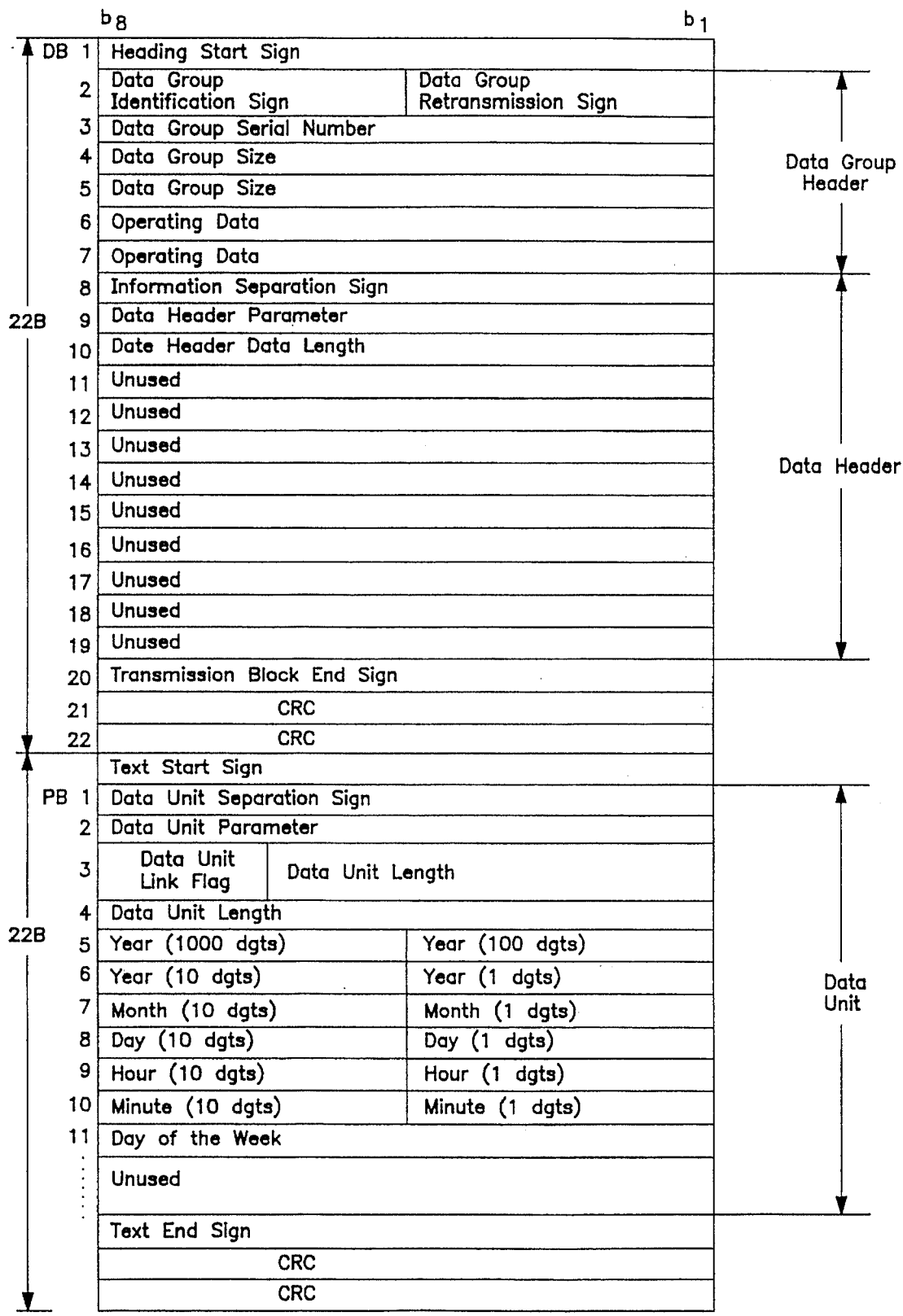
FIG. 24 is a view for explaining the operation in FIG. 22, schematically showing an example of the structure of a data group of time information.

In FIG. 23, designated by numeral 1 is a character signal extracting section for extracting character signals superimposed on vertical blanking periods from a video signal a; 4 is a decoder section for decoding the character signals extracted by the character signal extracting section 1 and developing them into character graphics for display; 5 is a buffer memory section for accumulating only the character signals extracted by the character signal extracting section 1; 6 is a display control section for actually displaying display data developed into character graphics at the decoder section 4 onto a screen or the like; 7 is a video memory section for storing display data to be actually displayed onto the screen or the like by the display control section 6; and 8 is a sound generator section for actually performing sound generation according to added sound data decoded by the decoder section 4. Further, designated by numeral 47 is a time information recognition means for recognizing that a relevant data unit is of time information from a data-unit parameter delivered from the reception means A; 48 is a time information processing means for processing time information such as year information, month information, day information, hour information, minute information, and second information from data-unit data detected by the time information recognition means 47; 49 is a time information setting means for automatically setting time information such as year information, month information, day information, hour information, minute information, and second information obtained by the time information processing means 48; and 50 is an image recording apparatus for performing video-recording operation according to the time information such as year information, month information, day information, hour information, minute information, and second information set by the time information setting means 49.

The receiver constructed as described above is below described with regard to its operation, referring to FIG. 23 and FIG. 24.

First, the character signal extracting section 1 extracts character signals superimposed on 14H, 15H, 16H, and 21H from the input video signal a. The decoder section 4 accumulates the character signals extracted by the character signal extracting section 1 in the buffer memory section 5 while it extracts program data of program numbers needing presentation from the character signals accumulated in the buffer memory section 5. Then it decodes the character signals as shown in FIG. 8, writing character/graphic screen information into the video memory section 7 through the display control section 6. The display control section 6 reads in series the character/graphic screen information written into the video memory section 7, yielding an output of display signal b. Further, the decoder section 4 decodes added sound information, if any in the program data needing presentation, transmitting sound generation data to the sound generator section 8. The sound generator section 8 produces a sound signal based on the sound generation data.

The detection of time information is performed by the time information recognition means 47. The recognition of time information is performed by a data-unit parameter as shown in FIG. 7. The data-unit parameter representing time information is hexadecimal data, which may be any 1-byte except 20, 24, 28, 2C, 30, 31, 32, 34, 35, 38, 39, 3B, 3C, 3D, 3E, and 3F. An example of the structure of the time information data group is shown in FIG. 24. Out of the time information data unit recognized and extracted by the time information recognition means 47, the time information processing means 48 reads year from PB 5 and PB 6 of the data unit of the time information data group, reads month from PB 7, reads day from PB 8, reads hour from PB 9, reads minute from PB 10, and reads day of the week from PB 11. The time information read by the time information processing means 48 is set to the image recording apparatus 50 by the time information setting means 49.

With such an arrangement, by newly providing data-unit parameters for time information by teletext in the coding transmission system and by transmitting the year information, month information, day information, hour information, minute information, second information, and the like of the time information as data-unit data, it is possible to automatically perform time setting and time correction for year, month, day, hour, minute, second, and the like and to utilize them for video-recording reservation operation on an image recording/reproducing apparatus or the like, thus allowing the information on teletext to be utilized on the receiver.

Industrial Applicability

According to the present invention, television-program table information by teletext in the coding transmission system can be automatically detected and displayed on a display unit, and reservation of a video recording on an image recording/reproducing apparatus such as a VTR can simply be performed only by selecting among the television numbers displayed on the screen of the display unit with the cursor, thus allowing the information on teletext to be effectively utilized on the receiver side. Furthermore, it follows up any change in the television-program table information.

What is claimed is:

1. A receiver, comprising:

reception means for receiving teletext data from a coding transmission system, wherein (1) recognition information and program-content update information of a television-program table are formatted using a page presentation data structure and presentation update control data structure, each of which have a predetermined number of bits, and (2) channel information, date information, time information, program code information, and title information of the television-program table are formatted as video information having a predetermined screen arrangement;

program recognition means for recognizing television-program table information from a predetermined bit of the page presentation data structure;

program update recognizing means, responsive to a group of predetermined bits of the presentation update control data structure, for recognizing that the television-program table information has been updated;

channel information processing means for processing channel information of a first character string of a first text line from a screen arrangement detected by said program recognition means;

date information processing means for processing date information of a second character string of the first text line from the screen arrangement detected by said program recognition means;

time information processing means for processing time information from the screen arrangement detected by said program recognition means;

program code information processing means for processing program code information from the screen arrangement detected by said program recognition means;

title information processing means for processing the title information from the screen arrangement detected by said program recognition means;

display means for displaying onto a display unit, as a displayed television-program table, the data processed by said program update recognizing means, channel information processing means, date information processing means, time information processing means, program code information processing means and title information processing means;

cursor display means for displaying a cursor said display unit;

cursor moving means for moving the cursor displayed by said cursor display means so as to designate television programs contained in the displayed television-program table;

selection means for selecting, for reservation for video recording, ones of the programs, designated by the cursor displayed by said cursor display means;

storage means for storing television-program table information such as channel information, date information, time information, program code information and title information of the corresponding to the ones of the programs selected by said selection means;

timer means for performing time management;

comparator means for comparing the date information and time information of the table information stored in said storage means with date information and time information of said timer means;

start instruction means for instructing an image recording/reproducing apparatus to start a video-recording operation when a starting time represented by the date information and time information of the stored table information coincides with the date information and time information of said timer means; and termination instruction means for instructing the image recording/reproducing apparatus to terminate the video-recording operation when a termination time represented by the date information and time information of the stored table information coincides with the date information and time information of said timer means.

2. A method of using transmitted program information to reserve time to record a program, wherein the transmitted program information includes television-program table information including channel information, date information, time information, program code information and title information and is transmitting, using teletext formatting, said method comprising the steps of:

receiving the television table information at an image recording apparatus;

recognizing the television-program table information where program numbers indicative of the television program table information are fixed, where said television program table information such as channel information, date information, time information, program code information and title information are transmitted by code data such that said channel information is represented by a first character string of a first text line in a 2-byte system, said date information is represented by a character string succeeding the channel information consisting of 1-byte system, 2-character month data and 2-character day data, and a symbol inserted between the month data and the day data for dividing the two pieces of the data, said time information including start time information designated as indispensable and terminate time information designated as dispensable, and being assigned by a character string consisting of 1-byte system, 2-character 24-hour-system hour data and 2-character minute data, and a symbol inserted between the hour data and the minute data for dividing the two pieces of data, a symbol added between the start information and the terminate time information for dividing the two pieces of information, the program code information being assigned by a character string of 1-byte system 2-character immediately following the character string representing the time information, and said title information being assigned a character string, whose location can be found from immediately after the program code information to before a next-program time information character string; and reserving time, for video recording, on the image recording apparatus according to the received television-program table information.

3. A receiver, comprising:

reception means for receiving teletext data from a coding transmission system in which program numbers of television-program table information are fixed and to which program-content update information, channel information, date information, time information, program code information and title information are formatted as video information;

program recognition means for recognizing television-program table information from the fixed program numbers;

program update recognizing means for recognizing and processing any update of the television-program table information content from the television-program table information detected by said program recognition means;

channel information processing means for processing channel information of a first character string on a first text line from the television-program table information detected by said program recognition means;

date information processing means for processing date information of a second character string on the first text line from the television-program table information detected by said program recognition means;

time information processing means for processing the time information from the television-program table information detected by said program recognition means;

program code information processing means for processing program code information from the television-program table information detected by said program recognition means;

title information processing means for processing the title information from the television-program table information detected by said program recognition means;

display means for displaying onto a display unit, as a displayed television-program table, the data processed by said program update recognizing means, channel information processing means, date information processing means, time information processing means, program code information processing means and title information processing means;

cursor display means for displaying a cursor for each program of television programs displayed by said display means;

cursor moving means for moving the cursor displayed by said cursor display means so as to designate programs contained in the displayed television-program table;

selection means for selecting, for reservation for video recording, ones of programs, designated by the cursor displayed by said cursor display means;

storage means for storing television-program table information such as channel information, date information, time information, program code information and title information corresponding to the ones of the programs selected by said selection means;

timer means for performing time management;

comparator means for comparing the date information and time information of the table information stored in said storage means with date information and time information of said timer means;

start instruction means for instructing an image recording/reproducing apparatus to start a video-recording operation when it is judged by said comparator means that a starting time represented by the date information and time information of the stored table information coincides with the date information and time information of said timer means; and termination instruction means for instructing the image recording/reproducing apparatus to terminate the video-recording operation when it is judged by said comparator means that a terminate time represented by the date information and time information of the stored table information coincides with the date information and time information of said timer means.

4. A method of using transmitted program information to reserve time to record a program, wherein the transmitted program information includes television-program table information including channel information, date information, time information, program code information and title information and is transmitting, using teletext formatting, said method comprising the steps of:

receiving the television table information at an image recording apparatus;

recognizing the television-program table information; and reserving time, for video recording, at the image recording apparatus according to the received television-program table information, wherein the step of recognizing the television-program table information uses a sign for identification of added service data which is assigned to a data group identification sign for performing identification of program management data or page data and program search data at a data group header section so that a channel identification number for identifying a broadcasting channel at a data header section, a program-content update index for notifying any update of program content, and a program broadcasting date for representing broadcasting date of a program are added as data;

a parameter for identification of being a data header related to added services is assigned to data header parameters for identifying a program data header, a page data header and a program search data header so that a television-program identification number for identifying each television program broadcast a day at a data-unit section, a program-classification identification index for representing program broadcasting smart time, program broadcasting terminate time, and type of program content, program-title data length for representing data length of a program title are added as data; and a parameter for identification of being added service data is assigned to data-unit parameters for identifying a type of data unit such as text, header text, and added sound information.

5. A method of using transmitted program information to reserve time to record a program, wherein the transmitted program information includes television-program table information including channel information, date information, time information, program code information and title information and is transmitting, using teletext formatting, said method comprising the steps of:

receiving the television table information at an image recording apparatus;

recognizing the television-program table information; and reserving time, for video recording, on the image recording apparatus according to the received television-program table information, wherein the step of recognizing the television-program table information uses a sign for identification of added service data which is assigned to a data group identification sign for performing identification of program management data or page data and program search data at a data group header section so that a channel identification number for identifying a broadcasting channel at a data header section, a program-content update index for notifying any update of program content, and a program broadcasting date for representing broadcasting date of a program are added as data;

a parameter for identification of being an added service data header is newly assigned to data header parameters for identifying a program data header, a page data header, and a program search data header so that a television-program identification number for identifying each television program broadcast a day at a data-unit section, a program-classification identification index for representing program broadcasting start time, program broadcasting terminate time, and type of program content, program-title display start position and program-title display terminate position for representing display position of a program title in vertical and horizontal directions when program title data is displayed on a screen are added as data; and a parameter for identification of being added service data is newly assigned to data-unit parameters for identifying a type of data unit such as text, header text and added sound information.

6. The method as claimed in claim 4 or 5 wherein, in addition to television program identification number, program broadcasting start time, program broadcasting terminate time, program-classification identification index, program title data length, program title, and, in claim 5, the program broadcasting start time, program broadcasting terminate time, program-classification identification index, program title display smart position, and program title display terminate position, a data length value representing data length of television-program table information being added to the foregoing data, a data control value representing type of data to be added unless the added data length is 0.

7. A method of using transmitted program information to reserve time to record a program, wherein the transmitted program information includes television-program table information including channel information, date information, time information, program code information and title information and is transmitting, using teletext formatting, said method comprising the steps of:

receiving the television table information at an image recording apparatus;

reserving time, for video recording, on the image recording apparatus according to the received television-program table information;

wherein the television-program table information being designated by bit 3 of a page presentation data structure;

instruction of update of the television-program table information being designated by bit 3, bit 4, bit 7, and bit 8 of presentation update control data structure;

the channel information, date information, time information, program code information and title information of the television-program table information being transmitted by code data, the channel information being of 2-byte system and assigned a first character string of a first text line, the date information consisting of 1-byte system 2-character month data and 2-character day data and a symbol inserted between the month data and the day data for dividing the two pieces of data, and being assigned by a character string succeeding the first-text-line channel information, the time information including start time information designated as indispensable and terminate time information designated as dispensable, being assigned by a character string consisting of 1-byte system 2-character 24-hour-system hour data and 2-character minute data and a symbol inserted between the hour data and the minute data for dividing the two pieces of data, and a symbol added between the start time information and the terminate time information for dividing the two pieces of information, the program code information being assigned by a character string of 1-byte system 2-character immediately following the character string representing the time information, and the title information being assigned by a character string ranging from immediately after the program code information to before the next-program time information character string.

\* \* \* \* \*

UNITED STATES PATENT AND TRADEMARK OFFICE
CERTIFICATE OF CORRECTION

PATENT NO. : 5,552,833
DATED : September 3, 1996
INVENTOR(S) : Hidemi Henmi et al.

It is certified that error appears in the above-indentified patent and that said Letters Patent is hereby corrected as shown below:

Column 24, claim 6, line 19, delete "smart" and insert --start--.

Signed and Sealed this

Twenty-fifth Day of February, 1997

Attest:

BRUCE LEHMAN

*Attesting Officer*     *Commissioner of Patents and Trademarks*